United States Patent
Nishio

(10) Patent No.: US 7,230,892 B2
(45) Date of Patent: Jun. 12, 2007

(54) METHOD AND APPARATUS FOR RECORDING AND REPRODUCING INFORMATION UTILIZING A SELECTION COMMAND THAT SELECTS RECORDED INFORMATION

(75) Inventor: Yoshimichi Nishio, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 511 days.

(21) Appl. No.: 10/714,625

(22) Filed: Nov. 18, 2003

(65) Prior Publication Data

US 2004/0114480 A1 Jun. 17, 2004

(30) Foreign Application Priority Data

Dec. 17, 2002 (JP) ............................ P2002-365114

(51) Int. Cl.
*G11B 7/00* (2006.01)
(52) U.S. Cl. ............................... 369/47.12; 369/47.13
(58) Field of Classification Search ..................... None
See application file for complete search history.

(56) References Cited

U.S. PATENT DOCUMENTS 6,925,340 B1* 8/2005 Suito et al. .................. 700/94

2001/0012411 A1 8/2001 Miyazaki et al. ........... 382/305
2004/0013058 A1 1/2004 Kudo ....................... 369/47.12
2006/0066970 A1* 3/2006 Arai et al. ..................... 360/8

FOREIGN PATENT DOCUMENTS

WO    WO 02/065468 A1    8/2002

* cited by examiner

*Primary Examiner*—William Korzuch
*Assistant Examiner*—Joseph Haley
(74) *Attorney, Agent, or Firm*—Drinker Biddle & Reath LLP

(57) ABSTRACT

There is provided an apparatus for recording and reproducing information. The apparatus comprises a reading device to read out information recorded on a recording medium, a first recording device in which the information read out by the reading device is written, an output device to output the information written in the first recording device, a second recording device in which the information read out by the reading device is recorded, and a controller. The controller controls the reading, first recording, output, and second recording devices such that an operation specified by an operation command and directed to all the information recorded on the recording medium is performed, during an operation for recording the information into the second recording device, and the recording operation is continued.

12 Claims, 8 Drawing Sheets

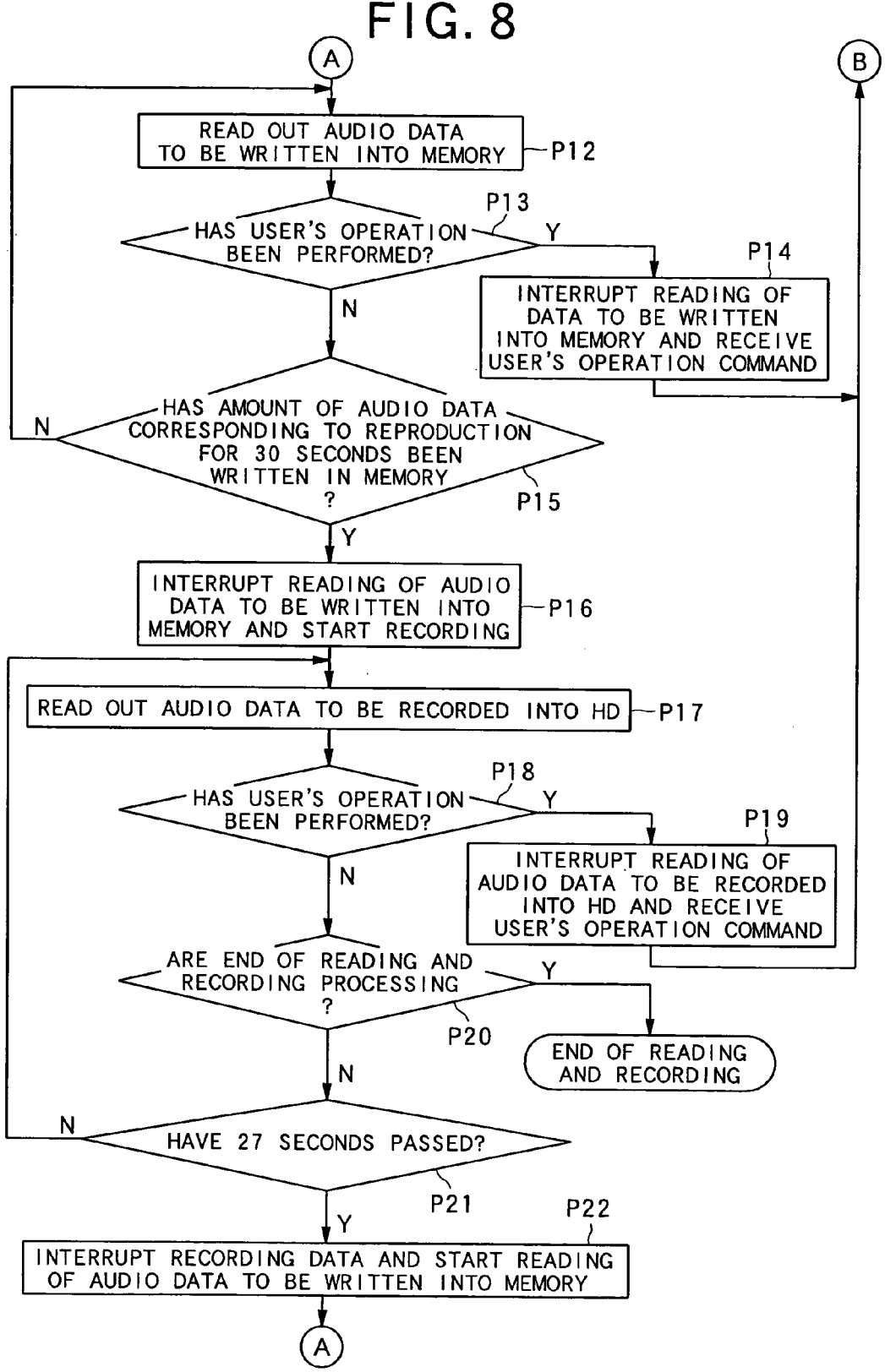

METHOD AND APPARATUS FOR RECORDING AND REPRODUCING INFORMATION UTILIZING A SELECTION COMMAND THAT SELECTS RECORDED INFORMATION

BACKGROUND OF THE INVENTION

1. The field of the invention

The present invention relates to an apparatus for recording and reproducing pieces of information.

2. Description of the Related Art

Products in which recording mediums, such as hard disks (hereinafter, simply referred to as HD), are mounted have already been in widespread use and are expected to grow into a developing market. The large-capacity recording mediums, such as HDs, are able to provide large-scale information (data) libraries, so that such mediums are epoch-making for the information recording reproducing apparatus.

In such a conventional information recording reproducing apparatus, data recorded on a recording medium is recorded onto a further recording medium such as HD, as the data are reproduced (i.e., outputted as audio information). Such a recording method is adopted by a HDD-mounted type CD player, where there are provided with a player to reproduce audio data recorded on a CD (Compact Disc) serving as a recording-origin medium, an HD on which audio data has been reproduced by the player is recorded, and a hard-disk drive (HDD) to record the audio data on the HD. Thus, while audio data under reproduction is outputted from such a device as speaker, the audio data are concurrently recorded onto the HD.

However, the conventional information recording reproducing apparatus has been confronted a difficulty in recording data (such as audio data) on a recording medium (such as HD). That is, in such an occasion, if a user wants to search data to be reproduced arbitrarily (i.e., outputted as sound) on a recording-origin medium and record the searched data onto an HD from start to finish, the recording operation which has now progressed should be stopped for searching the data. As a result, the data is obliged to be recorded on the recording medium in a half-way manner. Re-starting the recording operation toward the recording medium from the half-recording condition requires that various cumbersome work be done, which includes deletion of such half-recorded data and setting of connection positions of the data to be subjected to the re-start of the recording operation.

SUMMARY OF THE INVENTION

An object of the present invention is to provide, with due consideration to the difficulties of the above conventional technique, a method and apparatus for recording and reproducing pieces of information, which allow a user to arbitrarily select information (data) on an information-origin medium, without compelling the user to stop or end a recording operation with the information toward a recording medium such as HD.

In order to realize the above object, one aspect of the present invention is provided as an apparatus for recording and reproducing information. One mode is that the apparatus for recording and reproducing information, comprising: a reading device to read out information recorded on a recording medium; a first recording device in which the information that is read out by the reading device is written; an output device to output the information written in the first recording device; a second recording device in which the information that is read out by the reading device is recorded; and a controller to control the reading, first recording, output, and second recording devices such that an operation specified by an operation command issued from an operation device and directed to all the information recorded on the recording medium is performed, during an operation for recording the information into the second recording device; and the recording operation is continued.

As another mode, there is provided an apparatus for recording and reproducing information, comprising: a reading device to read out information recorded on a recording medium; a first recording device in which the information that is read out by the reading device is written; an output device to output the information written in the first recording device; a second recording device in which the information that is read out by the reading device is recorded; and a controller to control the reading, first recording, output, and second recording devices such that an operation for recording information into the second recording device is started at a time when an amount of the information accumulated in the first recording device reaches a given amount; an operation specified by an operation command issued from an operation device and directed to all the information recorded on the recording medium is performed, during the operation for recording the information into the second recording device; and the recording operation is continued even after the operation command was issued.

Still, another aspect of the present invention is a method of recording and reproducing information. One mode is that the method of recording and reproducing information recorded on a recording medium, comprising the steps of: reading out the information recorded on the recording medium; writing the read-out information into a first recording device; outputting the information written in the first recording device; recording the read-out information from the recording medium into a second recording device; performing an operation specified by an operation command issued from an operation device and directed to all the information recorded on the recording medium, during an operation for recording the information into the second recording device; and allowing the recording operation to be continued.

Another mode of the method according to the present invention is that the method of recording and reproducing information recorded on a recording medium, comprising the steps of: reading out the information recorded on the recording medium; writing the read-out information into a first recording device; outputting the information written in the first recording device; determining whether or not an amount of the information accumulated in the first recording device reaches a given amount; starting an operation for recording the read-out information from the recording medium into a second recording device when it is determined that the amount of the information accumulated in the first recording device has reached the given amount; performing an operation specified by an operation command and directed to all the information recorded on the recording medium, during the operation for recording the information into the second recording device; and allowing the recording operation to be continued even after the operation command was issued.

Still further, other aspects of the present invention are provided as a computer-readable program and an information recording medium in which the program is stored. The program, once adapted to the computer, is able to allow the computer to have the functions identical to the above configurations described by the method invention.

BRIEF DESCRIPTION OF THE DRAWINGS

Other objects and aspects of the present invention will become apparent from the following description of embodiments with reference to the accompanying drawings in which:

FIG. 8 is a further flowchart showing the reading and recording operations carried out next to those in FIG. 7.

DETAILED DESCRIPTION OF PREFERRED EMBODIMENTS

Preferred embodiments of an optical pickup according to the present invention will now be described hereinafter with reference to the accompanying drawings.

In the following embodiments, explanations will be given to an information recording reproducing apparatus to which the present invention is applied. The apparatus is provided with an information reproducing apparatus that reproduces information recorded on a DVD (Digital Versatile Disc) or a large-capacity recording medium, such as CD (Compact Disc), which is mounted on the information reproducing apparatus.

In general, an information reproducing apparatus which reproduces information recorded on a recording medium such as DVD or CD adopts a reproduction technique called shockproof reproduction. This shockproof reproduction is carried out such that pieces of information read out from a recording medium are written into a memory such as SDRAM (Synchronous DRAM), and the written information is read out in sequence for the output. In performing the shockproof reproduction, when a memory is occupied by written pieces of information, the operation to read information from a recording medium becomes a pause state. In this state, a certain period of time is given until the written information is outputted from the memory to form a certain amount of vacancy in the memory.

For instance, in an information reproducing apparatus with a memory of which recording capacity is around 40 MB, which is under the shockproof reproduction of information, about 30 seconds are given until the memory becomes vacant from its full state with decompressed data. In other words, in this case, the memory capacity corresponds to an amount of information to be accumulated for about 30 seconds, when the information on a recording medium is read out at a normal reading speed under the shockproof reproduction technique. The normal reading speed is defined every recording medium and is for instance an unmultiplied speed. In this way, the information reproducing apparatus with a large-capacity memory is able to allow the period of the posed state to be longer, without degrading the vibration proof.

(First Embodiment)

A first embodiment of the present invention will now be described.

Figure 1:
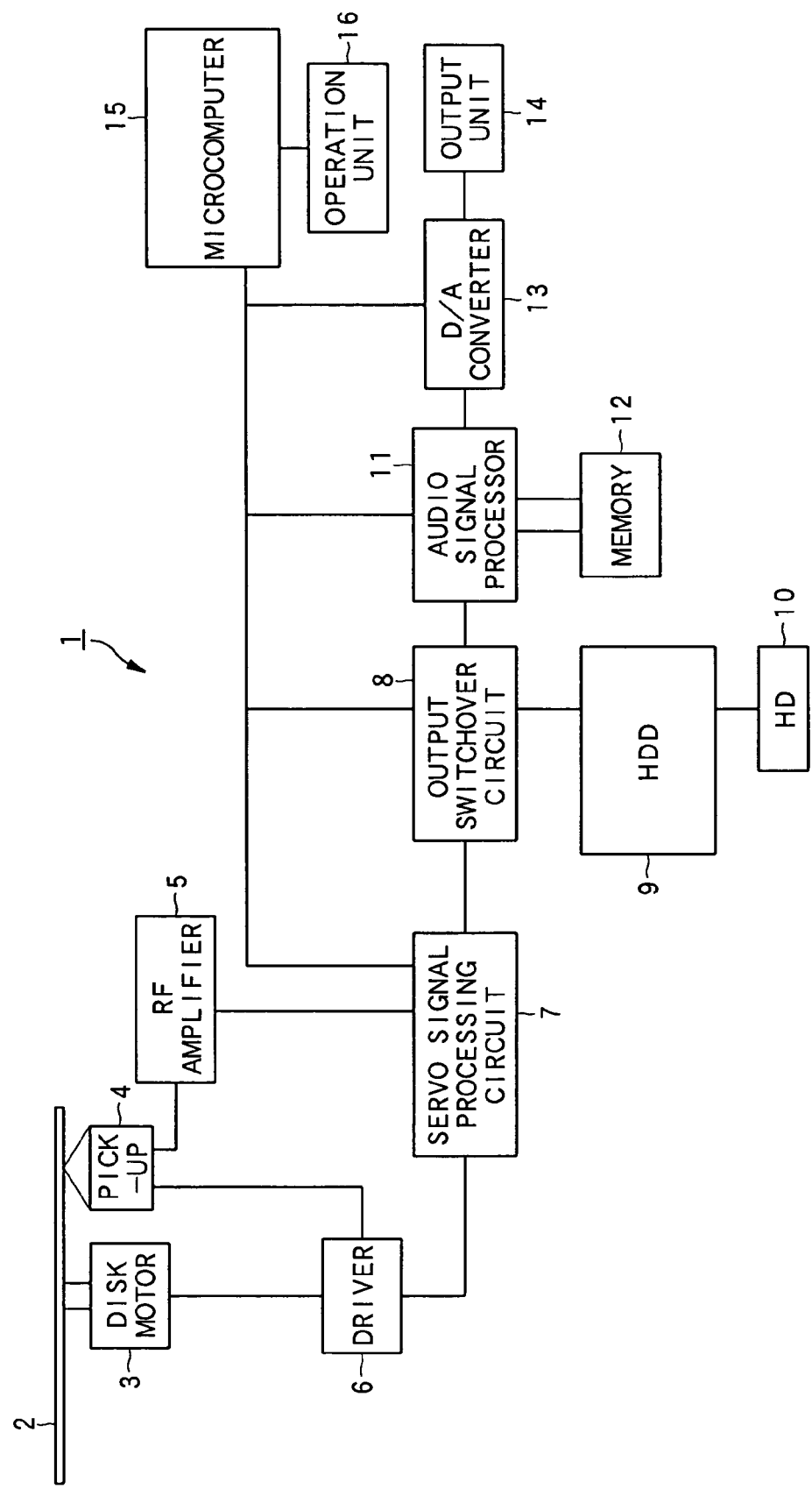
FIG. 1 is a block diagram showing a first embodiment of an information recording reproducing apparatus according to the present invention.

FIG. 1 is a block diagram showing an information recording reproducing apparatus according to the first embodiment, where a large-capacity recording medium, such as HD, is mounted on an information reproducing apparatus. In the first embodiment which will follow below, pieces of information recorded on an information medium are read out as decompressed audio data and the read-out audio data is recorded onto an HD, where the present invention is applied to such reading and writing operations of the information. The audio data to be processed in the first embodiment includes music data recorded on the medium as being plural pieces of music. The above information can also be composed of other types of data, such image data.

As shown in FIG. 1, an information recording reproducing apparatus 1 according to the first embodiment is provided with a disk motor 3 to rotate, at a constant linear velocity, a recording medium 2 (for example, DVD or CD) placed at a given clamp position; a pickup 4 serving as reading means for optically reading audio data recorded on the recording medium 2; an RF amplifier 5 to amplify the audio data that has been read out by the pickup 4; and a servo signal processing circuit 7 to not only demodulate the audio data amplified by the RF amplifier 5 but also provide servo control to both the disk motor 3 and the pickup 4 via a driver 6.

The pickup 4 according to this embodiment reads out the audio data recorded on the recording medium 2, at a faster reading speed, for instance, 4-multiplied speed, which is faster than the normal reading speed (which is defined every recording medium and is for instance an unmultiplied speed). In cases where the disk motor 3 is rotated at a 4-multiplied CLV (Constant Linear Velocity), the servo signal processing circuit 7 uses the signal read out by the pickup 4 in order to control the rotation speed of the disk motor 3 at the 4-multiplied speed. Thus, the rotations speed of the disk motor 3 becomes consistent with the reading speed of the pickup 4, with the result that audio data recorded on the recording medium 2 is read out in a normal fashion at a speed faster than the normal speed.

In the first embodiment, the rotation of the disk motor 3 at the normal CLV is to rotate it at a speed predetermined on the specifications, so that the 4-multiplied CLV allows the disk motor 3 to rotate at a speed that is four times faster than a speed predetermined on the specifications. For reading and outputting bits of information, speeds which are predetermined based on the specifications are adopted as normal speeds.

In addition, the information recording reproducing apparatus 1 is also provided with an output switchover circuit 3 to perform a switchover between a path for recording the audio data via the servo signal processing circuit 7 and a further path for outputting the audio data as an audio output without recording thereof; an HDD 9; an HD 10 serving as the second recording means. When the output switchover circuit 8 operates to switch its path to the HD 10, the audio data read out by the pickup 4 from the recording medium 2 is sent to the HD 10 via the servo signal processing circuit 7 and the HDD 9 and recorded on the HD 10.

In addition to the foregoing configurations, the information recording reproducing apparatus 1 is further provided with an audio signal processor 11, which is in charge of writing the audio data demodulated by the servo signal processing circuit 7 into a memory 12 serving as the first recording means and reading out audio data written on the memory 12. In response to a switchover of the internal path of the output switchover circuit 8 to the audio signal processor 11, the audio data read out by the pickup 4 from the recording medium 2 is supplied to the audio signal processor 11 via the servo signal processor 7, so that the audio data is written into the memory 12. The memory 12 is for example an SDRAM whose capacity is about 40 MB, which is, as stated above, determined to be an amount of accumulated information corresponding to around 30 seconds.

The information recording reproducing apparatus 1 is further provided with a D/A converter 13 to D/A-convert the data read out from the memory 12 by the audio signal processor 11; and an output unit 14 to output the analog-converted audio signal as an audio output. The output unit 4 includes amplifiers and speakers. The audio signal processor 11, D/A converter 13, and output unit 14 compose the output means.

The audio data written on the memory 12 is then outputted as sound at the normal speed (for example, a signal speed) under the operations of the audio signal processor 11, D/A converter 13, and output unit 14.

Further, the information recording reproducing apparatus 1 comprises a microcomputer 15 that functions as control means and an operation unit 16 that composes operation means. The microcomputer 15 is responsible for controlling the servo signal processing circuit 7, output switchover circuit 8, audio signal processor 11, and D/A converter 13. When an amount of audio data accumulated in the memory reaches a given amount corresponding to the acquisition carried out for 30 seconds, recording the audio data into the HD 10 will be started.

Furthermore, during a period of time (i.e., under recording the audio data into the HD 10) when the amount of the accumulated audio data reduces down to a further given amount corresponding to a recording operation for 6 seconds, which is less than the amount for 30 seconds, audio data on the recording medium 2 is allowed to be read out and outputted as sound. In this case the audio data to be read out and outputted is selected responsively to the operations corresponding to operations at the operation unit 16. Such operations include a user's command for selecting a piece of music and a user's command for specifying FF (fast forward)/REW (rewind) operations. In addition, the control is done such that, after issuing such operational commands, the operation for recording the audio data into the HD 10 will continue.

The operation carried out when an operation for selecting a piece of music is done at the operation unit 16 during recording the audio data recorded on the recording medium 2 into the HD 10 will now be explained with reference to FIG. 1. For example, a user presses down a not-shown operation button on the operation unit 16 for the selection of a piece of music, the operation unit 16 sends out a corresponding selection command to the microcomputer 15. When receiving the selection command, the microcomputer 15 controls the servo signal possessing circuit 7 to cause the driver 6 to interrupt an operation for reading audio data on the recording medium 2. Then, the pickup 4 is moved to the leading position of the audio data that composes a piece of music selected. Concurrently with the movement of the pickup 4, information indicative of a recorded position of audio data on the recording medium, which has been subjected to reading immediately before the issuance of the selection command is memorized into a not-shown internal memory. The internal path of the output switchover circuit 8 is switched to the audio signal processor 11. The pickup 4 reads out selected audio data recorded on the recording medium 2 at a 4-multiplied reading speed faster the normal speed. The read-out audio data is written into the memory 12 without being recorded into the HD 10. The audio data stored on the memory 12 is then read out by the audio signal processor 11, before being subjected to the processing at the audio signal processor 11, D/A converter 13, and the output unit 14, so that the audio data is outputted as sound at the normal speed (for example, a signal speed).

When an actually accumulated amount of audio data on the memory 12 reaches to an given data amount to be accumulated for 30 seconds, the microcomputer 15 controls the servo signal processing circuit 7 on the basis of information indicative of a recording position memorized in a not-shown internal memory of the microcomputer 15 in such a manner that the circuit 7 drives the driver 6 to move the pickup 4 to the recording position on the recording medium 2. Further, the output switchover circuit 8 switches its internal path to the HD 10. Hence, reading out audio data on the recording medium 2 is re-started from the recording position at the 4-multiplied speed, thereby read-out audio data being sent to the HDD 9 via the output switchover circuit 8 and being recorded into the HD 10 by the HDD 9. During this recording of the audio data into the HD 10, audio data of a piece of music selected by a user is read out from the memory 12 at the normal speed and outputted as sound.

In this way, even when an operation command is received from the operation unit 16 during recording the audio data into the HD 10, actions are performed responsively to the operation command, while the continuation of the data recording operation into the HD 10 is kept.

Figure 2:
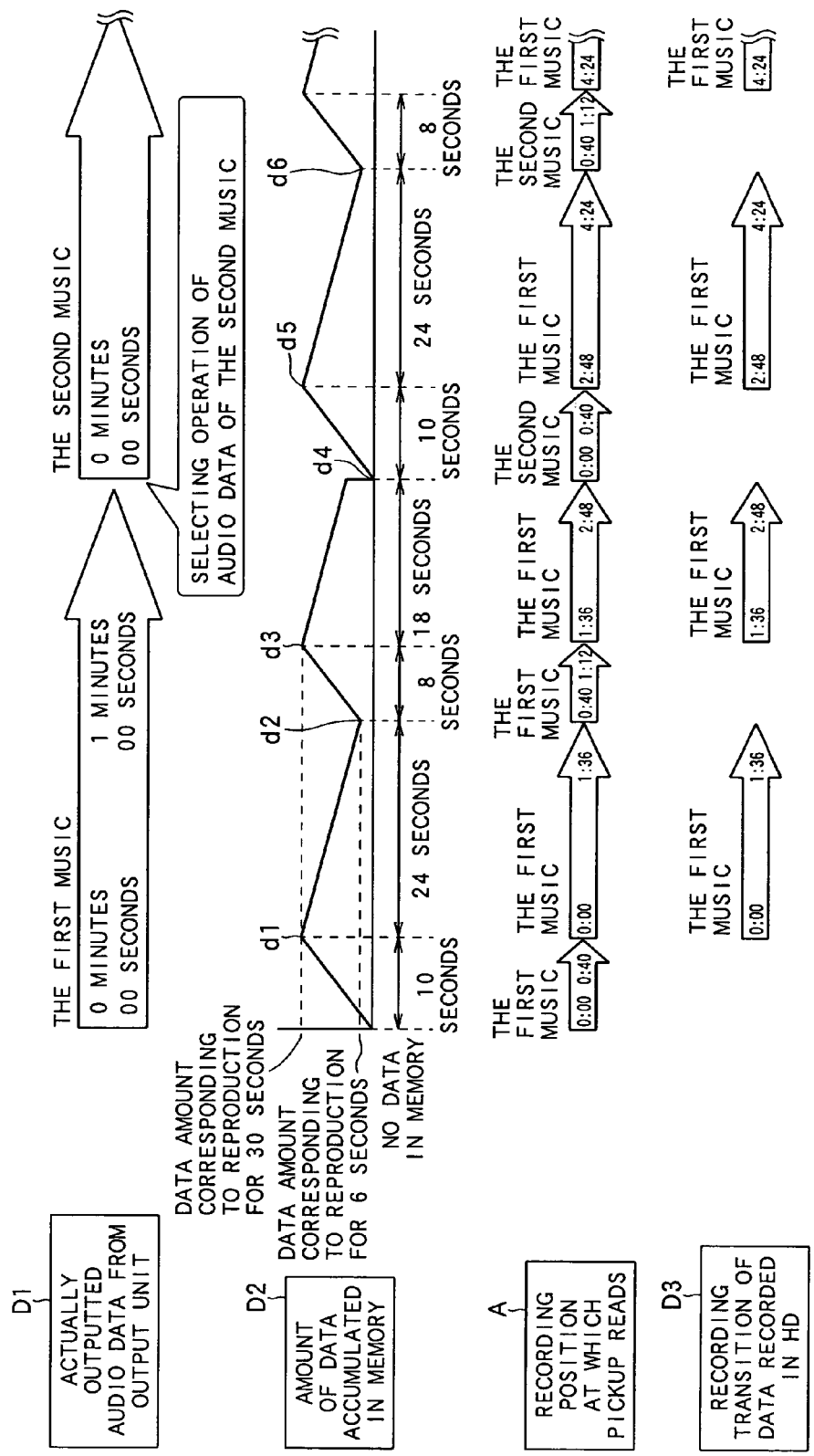
FIG. 2 is an illustration showing reading and recording operations carried out by the apparatus according to the first embodiment.
Figure 3:
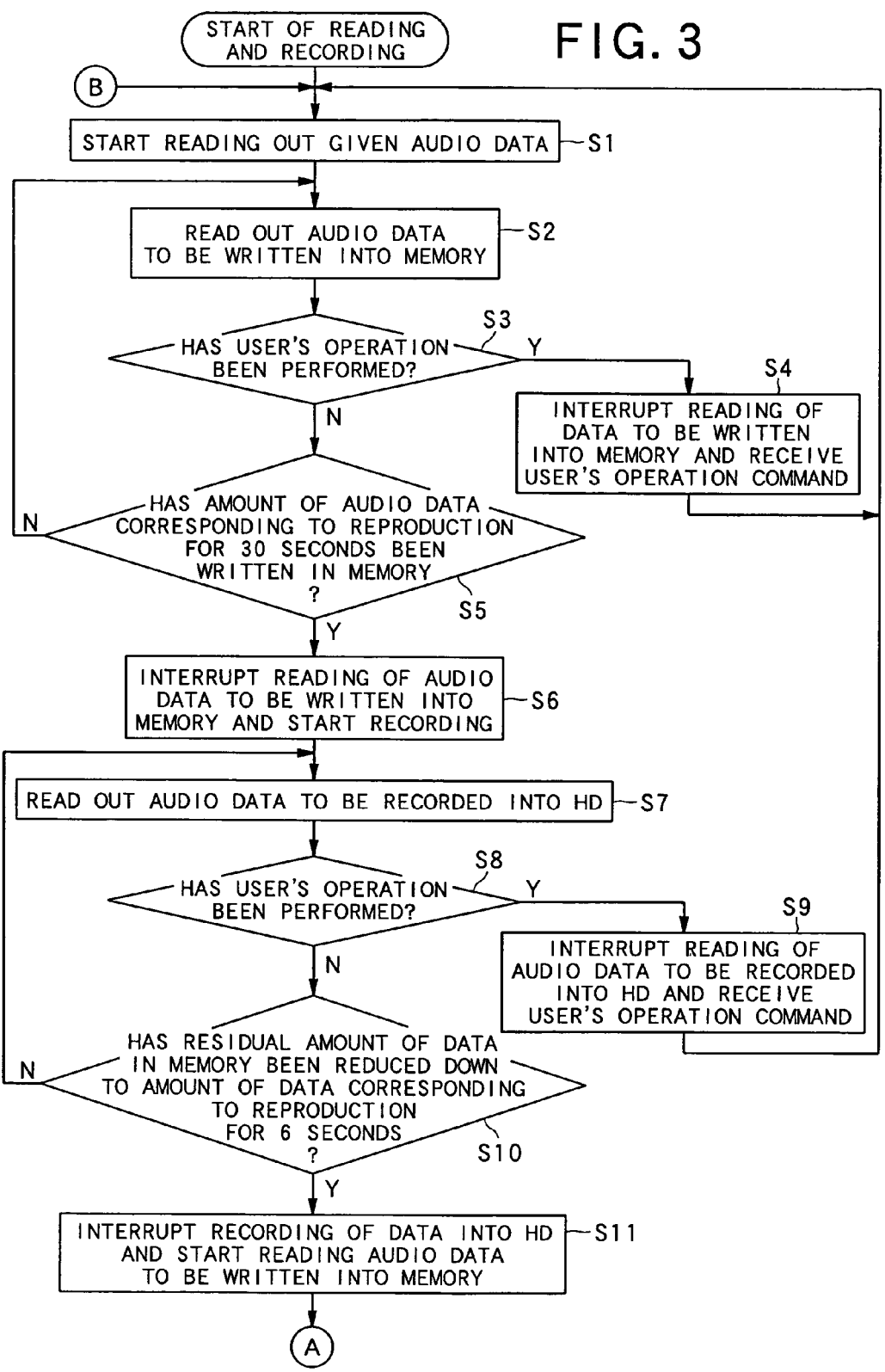
FIG. 3 is a flowchart showing the reading and recording operations in the first embodiment.
Figure 4:
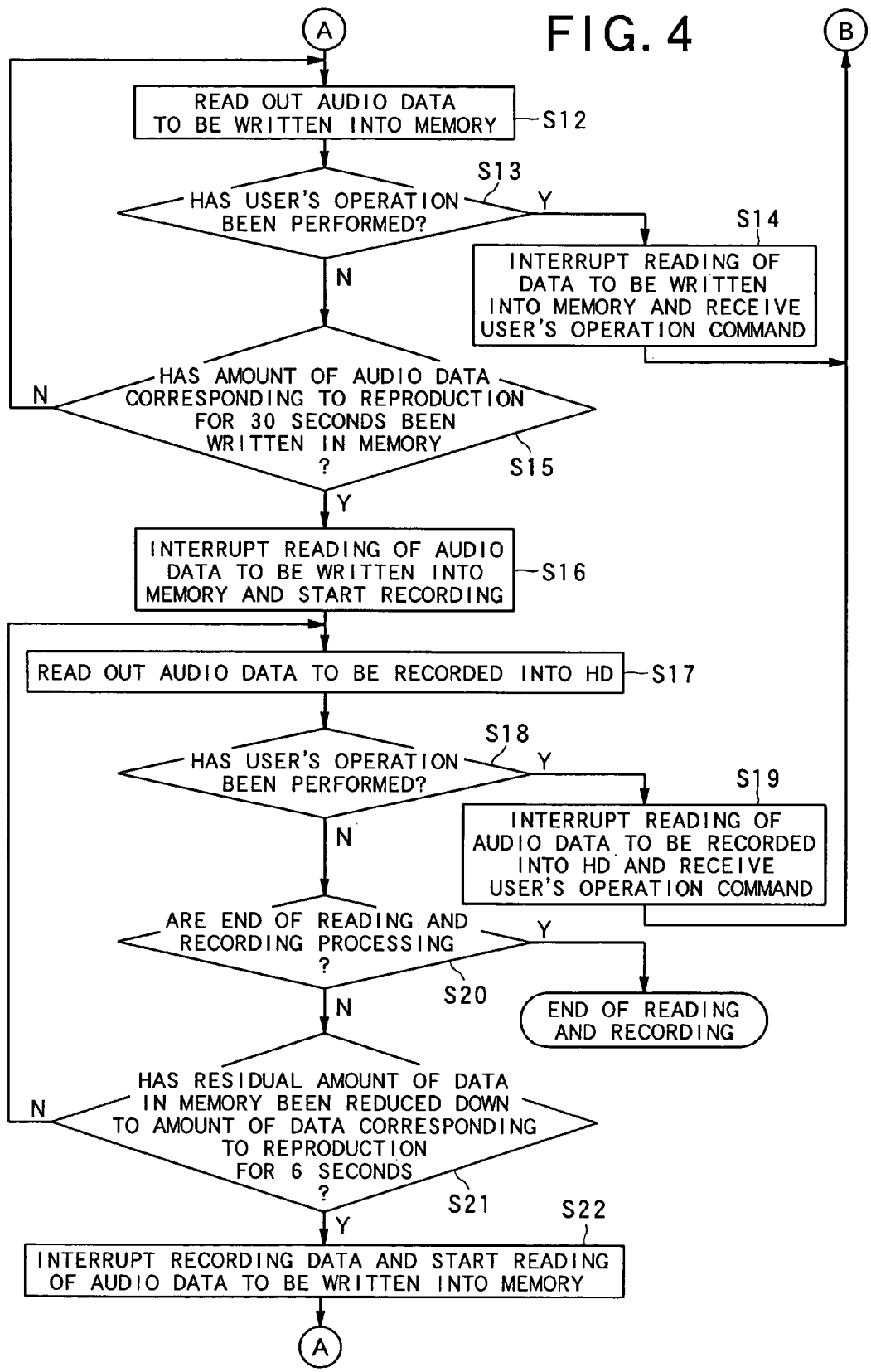
FIG. 4 is a further flowchart showing the reading and recording operations carried out next to those in FIG. 3.

Referring to FIGS. 2 to 4, the operation of the information recording reproducing apparatus will now be described. FIG. 2 explains the reading and recording operations carried out in the first embodiment.

In the information recording reproducing apparatus 1 according to the this first embodiment, an assumption is made such that the pickup 4 reads out audio data from the recording medium 2 at the 4-multiplied speed faster than the normal speed (for example, the unmultiplied speed) and the memory 12 has a capacity for memorizing an amount of audio data to be accumulated for 30 seconds.

In the following, two examples are provided. One example is as follows. When an accumulated amount of audio data on the memory 12 reaches a given amount to be memorized for 30 seconds, reading audio data from the pickup 4 (, which is carried out for writing the read-out audio data into the memory 12) is temporarily interrupted, and then reading audio data for recording the read-out audio data into the HD 10 is carried out. When the accumulated amount (residual amount) of audio data on the memory 12 reduces down to an amount to be memorized for 6 seconds, the operation is returned to reading the audio data to be written into the memory 12. The other example is that, in cases where a user operates the operation unit 16 during recording the audio data into the HD 10, reading audio data to be recorded into the HD 10 is interrupted, and then reading audio data to be written into the memory 12 is carried out.

FIG. 2 shows an actually outputted audio data D1 from the output unit 14 as sound, an amount D2 of audio data accumulated on the memory 12, recording (reading) positions A of audio data on the recording medium 2, the audio data being read out by the pickup 4, and recording transitions of audio data D3 to be recorded on the HD 10. In FIG. 2, arrows illustrate the operations along the time-axis direction.

As pictorially shown in FIG. 2, the audio data D1 actually outputted by the output unit 14 is provided at the normal speed (slower than the 4-multiplied reading speed; in the following, this normal speed is regarded as being unmultiplied speed).

Concerning the accumulated amount D2 of audio data on the memory 12, the lateral axis shows an elapse time including a reading elapse time for writing audio data into the memory 12 and an output elapse time for outputting audio data from the memory 12, while the longitudinal axis shows an accumulated amount of audio data written on the memory 12. This accumulated amount varies depending on the elapse time.

The reading positions A shown in FIG. 2 include recording positions A of audio data on the recording medium 2, which are read out by the pickup 4 to write the audio data into the memory 12, and recording positions A of audio data on the recording medium 2, which are read out by the pickup 4 to record the audio data on the HD 10. The arrows pictorially show the transitions of the reading positions as the time goes by.

The recording transitions of audio data D3 to be recorded on the HD 10 corresponds to the reading positions A of audio data on the recording medium 2, which are read out by the pickup 4. In other words, the recording transitions of audio data D3 show which audio data read out from the recording medium 2 by the pickup 4 is recorded on the HD 10.

The relationships among the various amounts illustrations in FIG. 2 will now be detailed together with the block diagram shown in FIG. 1.

At first, the microcomputer 15 controls the servo signal processing circuit 7 to allow the driver 6 to move the pickup 4 at the leading position of audio data of the first piece of music on the recording medium 2. The audio data of the first music is then read out at the 4-multiplied speed. That is, the pickup 4 starts reading out audio data from a recording position A "0:00" of the first music.

After this start, audio data on the recording medium 2 is read out, for instance, for a period of 10 seconds such that an amount of the read-out data corresponding to a period of 40 seconds ranging from a recording position A of "0:00" to another recording position A of "0:40" is obtained. Information indicating those recording positions A of "0:00" and "0:40" can be obtained by making reference to the data of sub-codes Q, if the recording medium 2 is a CD. In this case, the microcomputer 15 controls the output switchover circuit 8 so that its internal path is switched to the audio signal processor 11, thus audio data being not recorded on the HD 10, but being written on the memory 12. Further, the time for reading out audio data from the recording medium 2 can be controlled by making the microcomputer 15 monitor an accumulated amount of audio data written on the memory 12.

Since the audio data on the recording medium 2 is read out at the 4-multiplied speed, an amount of audio data which is read out for the period of 10 seconds is equal to an amount of audio data to be read out for 40 seconds at the normal speed. The audio data that has been read out for the 10 seconds is written on the memory 12, and then outputted as audio data D1 from the output unit 14. Accordingly, as shown in FIG. 2, an accumulated amount D2 of audio data on the memory 12 can reach an amount d1 corresponding to the acquisition for 30 seconds.

When an amount D2 of audio data accumulated on the memory 12 reaches the above amount d1, the microcomputer 15 orders that reading out the audio data be interrupted temporarily. Then the internal path of the output switchover circuit 8 is switched to the HD 10, and concurrently with this, information showing the recording position A of "0:40" of the audio data of the first music on the recording medium 2, which has been read out so far, is recorded into the internal memory of the microcomputer 15.

Then, the operation is shifted to recording the audio data into the HD 10. At first, the pickup 4 located at the recording position A "0:40" of the audio data of the first music on the recording medium 2 is returned to the recording position A "0:00" showing the leading position of the audio data of the first music. Then, from the recording position A "0:00," the audio data is read out at the 4-multiplied speed.

That is, though reading the audio data with the use of the pickup 4 has advanced to the recording position "0:40" of the first music, the audio data that was read out so far has not already been present on the HD 10. By using the information indicating the recording position "0:00" memorized in the internal memory thereof, the microcomputer 15 conducts control such that the pickup 4 is returned to the recording position "0:00" of the first music for reading audio data. The read-out audio data will not be outputted as sound from the output unit 14 (i.e., will not be written on the memory 12), but recorded into the HD 10. In this way, recording the audio data into the HD 10 is started. During this recording operation, the audio data stored on the memory 12 is outputted as sound from the output unit 14 at the normal speed.

When the recording operation toward the HD 10 is started, the audio data of the first music on the recording medium 2, an amount of which corresponds to the acquisition for 30 seconds from the recording positions A "0:10" to "0:40," is accumulated on the memory 12 (refer to the accumulated amount d1 in FIG. 2). The audio data is then outputted from the memory 12 at the normal speed, so that the accumulated (residual) amount D2 of the audio data on the memory 12 decreases gradually. This decrease continues until the accumulated amount D2 arrives at an amount d2 corresponding to acquisition for 6 seconds, during which time, that is, for a period of 24 seconds, the audio data on the memory 12 is outputted by the output unit 14 as sound at the normal speed.

Responsively to completion of this output, an accumulated amount of the audio data D1 outputted from the output unit 14 rises up to an amount corresponding to an output of the first music lasting for 34 seconds. Further, an amount of the audio data of the first music, which is read out from the recording medium 2 for recording audio data into the HD 10, rises up to an amount corresponding to the acquisition for 96 seconds, that is, four times 24 seconds (the recording positions A from "0:00" to "1:36" of the audio data of the first music). Corresponding to this, the recording position of the audio data D3 recorded on the HD 10 is shifted from the recording position A of "0:00" of the first music to another recording position A of "1:36."

When the accumulated amount D2 of the audio data on the memory 12 reduces down to the amount d2 determined corresponding to 6 seconds, the microcomputer 15 commands an interruption in the operation for reading the audio data through the pickup 4, which is for recording audio data into the HD 10. Namely, recording the audio data into the HD 10 is stopped temporarily. The operation is then returned to reading audio data through the pickup 4 in order to write the read-out audio data into the HD 10. At this stage, on the memory 12 is accumulated an amount of audio data corresponding to the acquisition carried out for 6 seconds counted from recording positions A "0:34" to "0:40" of the first music on the recording medium 2. Until audio data corresponding to the acquisition for 30 seconds counted from the recording position A "0:40" of the first music is written into the memory 12, the operation for reading audio data through the pickup 4 is allowed to write the read-out data into the memory 12.

To be specific, the microcomputer 15 performs control such that the pickup 4 is moved to the recording position A of "0:40" of the audio data of the first music on the basis of information indicative of the position A stored in the internal memory. Reading audio data of the first music is re-started at the 4-multiplied speed by the pickup 4 from the recording position A "0:40" on the recording medium 2.

The output switchover circuit 8 also operates to return its internal path to the audio signal processor 11, though the path has been switched to the HD 10 so far. In addition, information showing a recording position A of "1:36" of the audio data of the first music on the recording medium 2 is stored in the internal memory.

The information indicating the recording position A "1:36" shows a current final recording position A of the audio data recorded on the HD 10 and is different in nature from that indicating the foregoing recording position "0:40." Thus, a piece of information indicating the current final recording position A of the audio data written on the memory 12 and another piece of information indicating the current final recording position A of the audio data recorded on the HD 10 are stored in the internal memory in mutually different manners. These pieces of information indicating the final recording positions A are used to determine both of a pickup's reading start position in audio data recorded on the recording medium 2 when the audio data is written into the memory 12 and another pickup's reading start position in audio data recorded on the recording medium 2 when the audio data is recorded on the HD 10.

When reading the audio data of the first music is started by the pickup 4 at the recording position A of "0:40" in the audio data of the first music, audio data is read out from the recording medium 2 for a period of 8 seconds, an amount of the read-out audio data corresponding to the acquisition carried out for 32 seconds counted from the reading position "0:40" to another reading position "1:12."

Like the foregoing, the read-out audio data is not recorded on the HD 10, but written into the memory 12. The audio data that has been read out during the period of 8 seconds is actually outputted as sound from the output unit 14, after being outputted form the memory 12 as the audio data D1. Hence, as shown by a reference d3 in FIG. 2, the accumulated amount D2 of audio data on the memory 12 becomes equal to an amount corresponding to the acquisition for a period of 30 seconds, which is based on the computation of "audio data corresponding to a period of 6 seconds, which was residual on the memory 12"+"audio data corresponding to a period of 32 seconds, which has been read out this time"−"audio data corresponding to a period of 8 seconds, which has been outputted actually during the reading operation." At this time, the audio data from the recording positions A of "0:40" to "1:12" of the first music on the recording medium 2 has been written into the memory 12.

Then, when the accumulated amount D2 of the audio data written into the memory 12 reaches an amount of data corresponding to the acquisition carried out for 30 seconds, the microcomputer 15 orders a temporal interruption of reading out the audio data to be written into the memory 12. And the output switchover circuit 8 returns again its internal path to the HD 10. Concurrently with this, information showing the recording position A of "1:12" in the audio data of the first music on the recording medium 2 is memorized into the internal memory (that is, in the internal memory, the recording position A is updated from the "0:40" to "1:12").

The processing is then shifted to the operation for recording audio data into the HD 10.

First of all, the pickup 4 which has been located at the recording position of "1:12" is moved to a recording position A of "1:36" in the audio data of the first music on the basis of the information indicating the position and being stored in the internal memory. From the reading position A of "1:36," audio data is then read out at the 4-multiplied speed. That is, since the HD 10 has already stored therein the audio data up to the recording position A of "1:36" in the first music, the pickup 4 is moved to the recording position for reading the audio data. The read-out audio data will not be outputted through the output unit 4 (i.e., not written in the memory 12), but recorded into the HD 10.

In this way, without causing interruptions in the audio data stored on the HD 10, the operation for recording the audio data onto the HD can be continued. In the similar way to the foregoing, during the recording operation toward the HD 10, the audio data of the first music written on the memory 12 is supplied at the normal speed from the output unit 14.

When the recording operation toward the HD 10 is re-started, the audio data of the first music on the recording medium 2, which has been read out during an interval defined between the recording positions A "0:40" to "1:12," is accumulated on the memory 12 (refer to the accumulated amount d3 in FIG. 2). The audio data is then outputted from the memory 12 at the normal speed, so that the accumulated (residual) amount D2 of the audio data on the memory 12 decreases gradually. This decrease continues until the accumulated amount D2 arrives at an amount d2 corresponding to the acquisition for 6 seconds, during which time, that is, for a period of 24 seconds, the audio data on the memory 12 is outputted by the output unit 14 as sound at the normal speed.

Responsively to completion of this output, an accumulated amount of the audio data D1 outputted from the output unit 14 rises up to an amount corresponding to an output of the first music lasting for 1 minute and 12 seconds. Further, an amount of the audio data of the first music, which is read out from the recording medium 2 for recording the audio data into the HD 10, rises up to an amount corresponding to the acquisition for 96 seconds, that is, four times 24 seconds (the recording positions A from "1:36" to "3:12" in the audio data of the first music). Corresponding to this, the recording position of the audio data D3 recorded on the HD 10 is shifted from the positions "0:00" to "3:12" of the first music.

However, if an operation command is issued from the operation unit 16 during the reading operation toward the HD 10, transitions of the recording position are made as follows.

As shown in FIG. 2, assume that a user operates the operation unit 16 to issue an operation command for selecting the foregoing music, at the time when the accumulated amount D2 of the audio data on the memory 12 equals an amount d4 corresponding to the acquisition for 12 seconds before the amount corresponding to the acquisition for 6 seconds, on the way of the gradual decrease from the amount d3. In this case, an amount of the audio data D1 to be outputted as sound from the output unit 14 is equal to "1 minute and 00 second," which is equal to a sum of "the first 10 seconds"+"24 seconds in the first recording operation"+"8 seconds in the next reading operation"+"18 seconds until the user selects the track this time."

In addition, audio data of the first music read out from the recording medium 2, which is recorded into the HD 10, amounts up to a value that corresponds to reading carried out during 72 seconds, which are four times 18 seconds (the recording positions A from "1:36" to "2:48" in the audio data of the first music). Newly recorded audio data is added to the audio data D3 accumulated on the HD 10, so that the accumulated audio data D3 ranges from the recording positions from "0:00" to "2:48" of the first music.

Incidentally, when a user's operation command is issued, information indicative of a recording position A in the audio data, at which the pickup 4 reads out audio data at the time of the issuance of the user's operation command, is memorized into the internal memory. In the above example, information showing a recording position A of "2:48" is memorized (i.e., the recording position A of "1:36" which has been used so far is updated to a new recording position A of "2:48" in the audio data of the first music).

When receiving a user's selection command for a piece of music through the operation unit 16, the microcomputer 15 orders interruptions both of the reading operation of the pickup 4 and the recording operation of the audio data into the HD 10. Instead, the microcomputer 15 controls the servo signal processing circuit 7 and others to permit the operations in response to the user's music selection.

For example, as shown in FIG. 2, it is frequent that a user selects the second music during the output of the audio data of the first music. In this case, the operation is shifted to output audio data of the second piece of music as sound. The microcomputer 15 controls the servo signal processing circuit 7 to enable the driver 6 to move the pickup 4 to the leading position of the audio data of the second piece of music on the recording medium 2. The pickup 4 is then started to read out the audio data from a reading position A of "0:00" at the 4-multiplied speed. The audio data of the first music, which has been recorded on the memory 12 and of which amount corresponds to reading carried out for 12 seconds, is discarded, and the audio data of the second music which is read out by the pickup 4 is sequentially written into the memory 12.

To be specific, after the pickup 4 begins reading out the audio data of the second music, audio data on the recording medium 2 is read out, for instance, for a period of 10 seconds, an amount of the read-out data corresponding to a period of 40 seconds ranging from a recording position A of "0:00" to another recording position A of "0:40." In this case, the microcomputer 15 controls the output switchover circuit 8 so that it is switched to the audio signal processor 11, thus audio data being not recorded on the HD 10, but being written on the memory 12.

Since the audio data on the recording medium 2 is read out at the 4-multiplied speed, an amount of the audio data which is read out during the period of 10 seconds is equal to an amount of audio data to be read out for 40 seconds at the normal speed. The audio data of the second music that has been read out for the 10 seconds is written on the memory 12, and then outputted as audio data D1 from the output unit 14. Thus, the audio data of the first music that has been outputted as sound so far can be switched to that of the second music desired by the user. Accordingly, as shown in FIG. 2, an accumulated amount D2 of the audio data of the second music on the memory 12 reaches an amount d5 corresponding to the acquisition for 30 seconds.

When an amount D2 of audio data accumulated on the memory 12 reaches the amount d5, the microcomputer 15 orders that reading out the audio data be interrupted temporarily. Then the internal path of the output switchover circuit 8 is switched to the HD 10, and concurrently with this, information showing the recording position A of "0:40" of the audio data of the second music on the recording medium 2, which has been read out so far, is recorded into the internal memory of the microcomputer 15.

Then, the operation is shifted to recording the audio data into the HD 10. At first, based on the information indicative of the recording position of "2:48" of the first music recorded in the internal memory, the pickup 4 is returned to the recording position. Then, from the recording position A of "2:48" of the first music, the audio data is read out at the 4-multiplied speed. The read-out audio data will not be outputted as sound from the output unit 14 (i.e., will not be written on the memory 12), but recorded into the HD 10. In this way, the operation for recording the audio data of the first music into the HD 10 is performed continuously. During this recording operation, the audio data of the second music stored in the memory 12 is outputted as sound from the output unit 14 at the normal speed.

When the recording operation toward the HD 10 is started, the audio data of the second music on the recording medium 2, an amount of which corresponds to the acquisition for 30 seconds from the recording positions A of "0:10" to "0:40," is accumulated on the memory 12 (refer to the accumulated amount d5 in FIG. 2). The audio data is then outputted from the memory 12 at the normal speed, so that the accumulated (residual) amount D2 of the audio data on the memory 12 decreases gradually. This decrease continues until the accumulated amount D2 arrives at an amount d6 corresponding to the acquisition for 6 seconds, during which time, that is, for a period of 24 seconds, the audio data on the memory 12 is outputted through the output unit 14 as sound at the normal speed.

Responsively to completion of this output, an accumulated amount of the audio data D1 outputted from the output unit 14 rises up to an amount corresponding to an output of the second music lasting for 1 minute and 12 seconds. Further, an amount of the audio data of the first music, which is read out from the recording medium 2 for recording audio data into the HD 10, rises up to an amount corresponding to the acquisition for 96 seconds, that is, four times 24 seconds (the recording positions A from "2:48" to "4:24" of the audio data of the second music). Corresponding to this, because the new recorded audio data is added, the recording position of the audio data D3 recorded on the HD 10 is shifted from the recording position A of "0:00" of the first music to another recording position A of "4:24."

When the accumulated amount D2 of the audio data on the memory 12 reduces down to the amount d6 determined corresponding to 6 seconds, the microcomputer 15 commands an interruption in the operation for reading the audio data through the pickup 4, which is for recording audio data into the HD 10. Namely, recording the audio data into the HD 10 is stopped temporarily. The operation is then returned to reading audio data through the pickup 4 in order to write the read-out audio data into the HD 10. At this stage, on the memory 12 is accumulated an amount of audio data corresponding to the acquisition carried out for 6 seconds counted from recording positions A of "0:34" to "0:40" of the second music on the recording medium 2. Until audio data corresponding to the acquisition for 30 seconds counted from the recording position A "0:40" of the second music is written into the memory 12, the operation for reading audio data through the pickup 4 is allowed to write the read-out data into the memory 12.

To be specific, the microcomputer 15 performs control such that the pickup 4 is moved to the recording position A of "0:40" of the audio data of the second music on the basis of information indicative of the position A stored in the internal memory. Reading audio data of the second music is re-started at the 4-multiplied speed by the pickup 4 from the recording position A "0:40" on the recording medium 2.

The output switchover circuit 8 also operates to return its internal path to the audio signal processor 11, though the path has been switched to the HD 10 so far. In addition, information showing a recording position A of "4:24" of the audio data of the first music on the recording medium 2 is stored in the internal memory.

When reading the audio data of the second music is started by the pickup 4 at the recording position A of "0:40" in the audio data of the second music, audio data is read out from the recording medium 2 for a period of 8 seconds, an amount of the read-out audio data corresponding to the acquisition carried out for 32 seconds counted from the reading position "0:40" to another reading position "1:12."

Like the foregoing, the read-out audio data is not recorded on the HD 10, but written in the memory 12. The audio data that has been read out during the period of 8 seconds is actually outputted as sound from the output unit 14, after being outputted form the memory 12 as the audio data D1. Hence, as shown by a reference d7 in FIG. 2, the accumulated amount D2 of audio data on the memory 12 becomes equal to an amount corresponding to the acquisition for a period of 30 seconds, which is based on the computation of "audio data corresponding to a period of 6 seconds, which was residual on the memory 12"+"audio data corresponding to a period of 32 seconds, which has been read out this time"–"audio data corresponding to a period of 8 seconds, which has been outputted actually during the reading operation." At this time, the audio data from the recording positions A of "0:40" to "1:12" of the second music on the recording medium 2 has been written into the memory 12.

Performing operations in the same way as the above makes it possible that a user selects freely a desired piece of music (desired audio data) recorded on the recording medium 2 and the audio data selected by the user is outputted as sound, without being forced to end the recording operation toward the HD 10.

By the way, various modifications with regard to the above configurations are still possible. The foregoing configuration has been described about the situation where a user's operation command is issued in an output of audio data from the memory 12 in the form of sound. However this is not a definitive list. For example, the present invention can be applied to a situation where a user's operation command is issued in writing audio data into the memory 12. Such a situation may occur in a period of d2 to d3 in FIG. 2, during which an amount of audio data accumulated in the memory 12 is on the increase. In such a situation, both of audio data that was remained in the memory 12 and audio data which has now written into the memory 12 are discarded, and the pickup 4 is moved to the leading position of audio data of music to be selected. This modification is then subjected to the foregoing operations that have been explained about the second music. Therefore, this modification allows a concept of a recording operation toward a second recording medium according to the present invention to include a concept of a writing operation toward a first recording medium according to the present invention.

In addition, a user's selection of a desired piece of music is not limited to the second piece of music, but applied to all pieces of music recorded on the recording medium 2. To be specific, if there are recorded ten pieces of music on the recording medium 2, a user is allowed to select the tenth piece of music as well.

Further, in the present invention, user's operations include any kind of operation command, such as a scan reproduction command and a random reproduction command, which are carried out using all the ten pieces of music. Examples are as follows. In cases where a scan reproduction command is issued in the recording operation (for example, assume that the scan reproduction is carried out by reproducing a music leading portion every 10 seconds), audio data stored into the memory 12 after the issuance of the scan reproduction command is discarded, and then audio data of each of the first to fourth pieces of music recorded on the recording medium 2 is read out every ten seconds at the 4-multiplied speed from the leading position of each piece of music so that the read-out audio data is written into the memory 12. If a random reproduction command is issued in the recording operation, audio data stored into the memory 12 after the issuance of the random reproduction command is discarded, and then audio data of each of piece of music automatically chosen by the apparatus is read out at the 4-multiplied speed so that the read-out audio data is written into the memory 12.

Referring to FIGS. 3 and 4, the reading and recording operations in the first embodiment will now be described.

As shown in FIG. 3, first, reading out specified audio data from a recording medium 2 is started to write the read-out audio data into the memory 12 (step S1). For example, responsively to a user's operation to load the information recording reproducing apparatus 1 with the recording medium 2, reading out audio data of the first piece of music is activated. That is, from the leading address of the first music on the recording medium 2 (i.e., the address corresponds to the foregoing recording position A), audio data is read out for 10 seconds (step S2).

Because this reading operation is carried out at the 4-multiplied speed, the audio data to be read out for 10 seconds mounts up to a volume corresponding to data acquisition for 40 seconds. During this reading operation, an amount of audio data corresponding to the acquisition for 10 seconds is outputted as sound through the output unit 14 at the normal speed, whereby audio data corresponding to the acquisition for remaining 30 seconds is still accumulated in the memory 12. Steps S2 to S5 will be repeated until such an amount of audio data is accumulated in the memory 12.

Until such an accumulation of audio data is realized in the memory 12, the microcomputer 15 monitors a user's operation by determining whether or not a user has operated the operation unit 16 to issue a selection of another piece of music, san reproduction operation, random reproduction operation, or others (step S3). If it is determined that the user has conducted any operation, such as the above (YES at step S3), the microcomputer 15 performs control in such a manner that the reading operation with the audio data to be written into the memory 12 is interrupted and accepts an operation command originated from the user (step S4). The processing is then returned to step S1.

As a result, the reading operation with audio data directed to writing into the memory 12, which has been conducted so far, is interrupted and the audio data which has been stored in the memory 12 is discarded. In cases where, for example, the user's operation is selection of a piece of music, the pickup 4 is moved to the leading address of audio data of the selected music on the recording medium 2. To again write audio data into the memory 12, the audio data of the selected music is subjected to reading from its leading address.

In contrast, at step S3, if it is determined that any user's operation has not been issued (NO at step S3), the processing is made to proceed to step S5.

At step S5, the microcomputer 15 determines if or not audio data corresponding to the acquisition for 30 seconds has been written into the memory 12 (that is, an amount of audio data accumulated in the memory 12 becomes full). If this determination shows that such full accumulation is realized (YES at step S5), the reading operation with audio data through the pickup 4, which has been conducted to write audio data into the memory 12, is temporality interrupted. At the time when an accumulated amount in the memory 12 becomes full, an address at which audio data is finally read out (i.e., the final address) is memorized, and then recording processing toward the HD 10 is started (step S6).

In the recording processing, the processing for reading audio data to be recorded into the HD 10 is carried out (step S7). For reading out audio data in step S7, control is made such that the output switchover circuit 8 switches its internal path to the HD 10 and the pickup 4 moves to the leading address of the audio data of the first music on the recording medium 2. Then reading out the audio data is started from its leading address. The resultant read-out audio data is recorded, in turn, from the first music, into the HD 10 via the HDD 9, not outputted through the output unit 14. During this recording operation toward the HD 10, the audio data accumulated in the memory 12 is outputted as sound via the output unit 14.

In contrast, if the audio data corresponding to the acquisition for 30 seconds has yet to be accumulated in the memory 12 (NO at step S5), the processing is returned to step S2. Thus, until such a full amount of audio data is accumulated, the reading processing with audio data is executed to write the audio data into the memory 12.

At the time when the recording processing with the audio data toward the HD 10 is started, the memory 12 has memorized an amount of audio data corresponding to the acquisition for 30 seconds. During the recording operation, the audio data in the memory 12 is outputted as sound in sequence at the normal speed through the output unit 14. The accumulated amount of the audio data in the memory 12 thus decreases little by little, and down to an amount corresponding to the acquisition carried out for 6 seconds, during which time the recording processing toward the HD 10 is continued for 24 seconds. In consequence, owing to the fact that the pickup 4 reads out the audio data at the 4-multiplied speed, an amount of audio data that equals the acquisition carried out for 96 seconds (1 minute and 36 seconds) can be recorded into the HD 10 for a period of 24 seconds.

During the reading-out operation of the audio data executed at step S7 in order to record audio data into the HD 10, the microcomputer 15 monitors a user's operation by determining whether or not a user has operated the operation unit 16 to issue a selection of another piece of music, san production operation, random reproduction operation, or others (step S8). If it is determined that the user has conducted any operation, such as the above (YES at step S8), the microcomputer 15 performs control in such a manner that the recording operation toward the HD 10 is interrupted and accepts an operation command originated from the user (step S9). The processing is then returned to step S1.

Through the processing at step S9, the audio data that remains in the memory 12 at the time when the recording processing is ordered to interrupt is discarded and the internal path in the output switchover circuit 8 is switched to the audio signal processor 11. Moreover, information showing a final address of the audio data in the HD 10, which is determined at the time the recording processing is interrupted, is memorized.

As stated above, the processing is returned to step S1. Thus, in the case that the operation command receiving at step S1 from the operation unit 16 is selection of a piece of music, the pickup 4 is moved to the leading address of the audio data of the selected music in order to start, from the leading address, the reading processing with audio data to be written into the memory 12. This reading processing is followed by the processing at step S2 and subsequent steps. In this following proceeding, at step S7, the reading processing to record audio data into the HD 10 is re-started from the final address of the audio data determined at the time when the recording processing was interrupted in response to the user's operation.

In contrast, at step S8, if it is determined that any user's operation has not been issued (NO at step S8), the processing is made to proceed to step S10.

At step S10, the microcomputer 15 determines whether or not an amount of the audio data accumulated in the memory 12 has been reduced down to a volume corresponding to the acquisition for 6 seconds. If such a decrease has been determined (YES at step S10), the recording processing toward the HD 10 is interrupted, while the internal path in the output switchover circuit 8 is switched to the audio signal processor 11 to re-start reading audio data with the use of the pickup 4, so that read-out audio data is written into the memory 12 (step S11).

To be specific, a final address of audio data in the HD 10, which is determined at the time when the recording processing is interrupted, is memorized, whilst the pickup 4 is moved back to a recording position specified by the final address of audio data in the memory 12, the final address being memorized by the processing at step S6. Reading out audio data is thus re-started at the moved-back recording position to write the read-out audio data into the memory 12.

In contrast, at step S10, if it is determined that the amount of the audio data accumulated in the memory 12 has yet to decrease down to the volume corresponding to the acquisition for 6 seconds (NO at step S10), the processing is returned to step S7 to continue the recording processing toward the HD 10.

At the time when the reading processing is re-started at step S11, an amount of audio data that corresponds to the acquisition for 6 seconds is accumulated in the memory 12. Hence, until the accumulated amount of audio data rises up from this amount to an amount corresponding to the acquisition for 30 seconds, the processing for reading out audio data via the pickup 4 is performed (step S12 in FIG. 4).

Then, it is again determined whether or not the user has performed such an operation as selection of a piece of music (step S13). When it is determined that the user has performed such an operation (YES at step S13), the reading operation with the audio data to be written into the memory 12 is interrupted and an operation command originated from the user is received (step S14). The processing is then returned to step S1.

At step S14, the audio data stored in the memory 12 at the time when the recording processing is interrupted is discarded and the internal path in the output switchover circuit 8 is switched to the audio signal processor 11. In cases where, for example, the user's operation is selection of a piece of music, the pickup 4 is moved to a recording position specified by the leading address of audio data of the selected music on the recording medium 2. To write audio data into the memory 12, the audio data of the selected music is subjected to reading from its leading address.

In contrast, at step S13, if it is determined that any user's operation has not been issued (NO at step S13), the processing is made to proceed to step S15.

At step S15, it is determined whether or not an amount of audio data that corresponds to the acquisition for 30 seconds has been written in the memory 12. If such an amount of audio data has been written in the memory 12 (YES at step S15), the reading processing with audio data to be written into the memory 12 is interrupted to move to recording processing toward the HD 10 (step S16).

The pickup 4 is first moved to a recording position specified by the final address of audio data in the HD 10, the final address being memorized at step S11. The internal path in the output switchover circuit 8 is switched to the HD 10 in order that the processing for reading audio data subjected to the recording processing is re-started at the recording position pointed by the final address. Then audio data is read out from the final address, while the read-out audio data is subjected to be recorded into the HD 10 by means of the HDD 9 (step S17).

During the reading-out operation with the audio data executed at step S17 in order to record audio data into the HD 10, the microcomputer 15 monitors a user's operation by again determining whether or not a user has operated the operation unit 16 to issue a selection of another piece of music, scan reproduction operation, random reproduction operation, or others (step S18). If it is determined that the user has conducted any operation, such as the above (YES at step S18), the microcomputer 15 performs control in such a manner that the recording operation toward the HD 10 is interrupted and accepts an operation command originated from the user (step S19). The processing is then returned to step S1.

Through the processing at step S19, the audio data that remains in the memory 12 at the time when the recording processing is ordered to interrupt is discarded and the internal path in the output switchover circuit 8 is switched to the audio signal processor 11. Moreover, information showing a final address of the audio data in the HD 10 is memorized.

As stated above, the processing is returned to step S1. Thus, in the case that the operation command receiving at step S1 from the operation unit 16 is selection of a piece of music, the pickup 4 is moved to the leading address of the audio data of the selected music in order to start, from the leading address, the reading processing with audio data to be written into the memory 12. This reading processing is followed by the processing at step S2 and subsequent steps. In this following proceeding, at step S7, the reading processing to record audio data into the HD 10 is re-started from the final address of the audio data determined at the time when the recording processing was interrupted in response to the user's operation.

In contrast, at step S18, if it is determined that any user's operation has not been issued (NO at step S18), the processing is made to proceed to step S20.

Then, at step S20, it is determined by the microcomputer 15 whether or not the reading and recording operations should be ended or not. This determination is made based on, for example, an operation command showing if or not a user has operated either the power button or the disk eject button. A signal indicative of such a command can be received from the operation unit 16. When it is determined that the termination of the reading and recording operations has been commanded (YES at step S20), such operations are ended. When it is however determined the operations should be continued (NO at step S20), the processing goes to step S21.

At step S21, the microcomputer 15 determines whether or not an amount of the audio data accumulated in the memory 12 has been reduced down to a volume corresponding to the acquisition for 6 seconds. If such a decrease has been determined (YES at step S21), the recording processing toward the HD 10 is interrupted, while the internal path in the output switchover circuit 8 is switched to the audio signal processor 11 to re-start reading audio data with the use of the pickup 4, so that read-out audio data is written into the memory 12 (step S22).

To be specific, a final address of audio data in the HD 10, which is determined at the time when the recording processing is interrupted, is memorized, whilst the pickup 4 is moved back to a recording position specified by the final address of audio data in the memory 12, the final address being memorized by the processing at step S16. Reading out audio data is thus re-started at the moved-back recording position to write the read-out audio data into the memory 12.

In contrast, at step S21, if it is determined that the amount of the audio data accumulated in the memory 12 has yet to decrease down to the volume corresponding to the acquisition for 6 seconds (NO at step S21), the processing is returned to step S17 to continue the recording processing toward the HD 10.

After the processing at step S22, the processing is made to return to step S12 so as to repeat the processing at step S12 and subsequent steps.

In the first embodiment, whenever an amount of audio data accumulated in the memory 12 decreases down to an amount decided in accordance with 6 seconds, the processing is returned to the operation for reading audio data to be written into the memory 12. This time of 6 seconds is decided to take it into consideration a period of time necessary for the pickup 4 to move from a recording position specified by the final address of audio data in the memory 12 to that specified by the final address of audio data in the HD 10. An actual necessary time for the movement of the pickup 4 is approximately 3 seconds. However, a temporal margin of 3 seconds is added, so that the time of 6 seconds is decided.

In this way, in the information recording and reproducing apparatus 1 according to the first embodiment, audio data recorded on the recording medium 2 is read out and written into the memory 12 at the 4-multiplied speed faster than an unmultiplied speed at which audio data is read out from the memory 12. Hence it is possible to accumulate in the memory 12 an amount of audio data that corresponds to data acquisition carried out for 30 seconds, during only a reading operation for 10 seconds. While audio data is gradually outputted as sound from the memory (of which initial accumulated data amount corresponds to the acquisition for 30 seconds), audio data can be read out from the recording medium 2 at the 4-multiplied speed so that the read-out audio data is recorded into the HD 10. Accordingly, if a user issues a command for selecting a piece of music or for other actions during the operation for recording audio data into the HD 10, the recording operation is temporarily interrupted and audio data of the selected music is accumulated into the memory 12 by an amount corresponding to the acquisition for 30 seconds, and then the recording operation is continued. This way of processing makes it possible to output user's desired audio data as sound without being forced to stop the recording operation toward the HD 10.

By the way, the programs expressed by the flowcharts in FIGS. 3 and 4 can be stored on an information recording medium, such as floppy (R) disk or hard disk. Making a computer (e.g., microcomputer) read such programs for execution allows the computer to function as the information recording reproducing apparatus 1 according to the present embodiment.

(Second Embodiment)

A second embodiment of the information recording and reproducing apparatus according to the present invention will now be described.

In the second embodiment, audio data recorded as information on a recording medium is compressed, so that the compressed audio data is read out therefrom and recorded into an HD. The present invention is applied to the reading and recording operations for such compressed audio data.

The audio data is one example to which the present invention is applicable, and various types of information, such as image data, can be adopted as information according to the present invention. The audio data according to the second embodiment is described as music data consisting of a plurality of pieces of music recorded on the recording medium.

Figure 5:
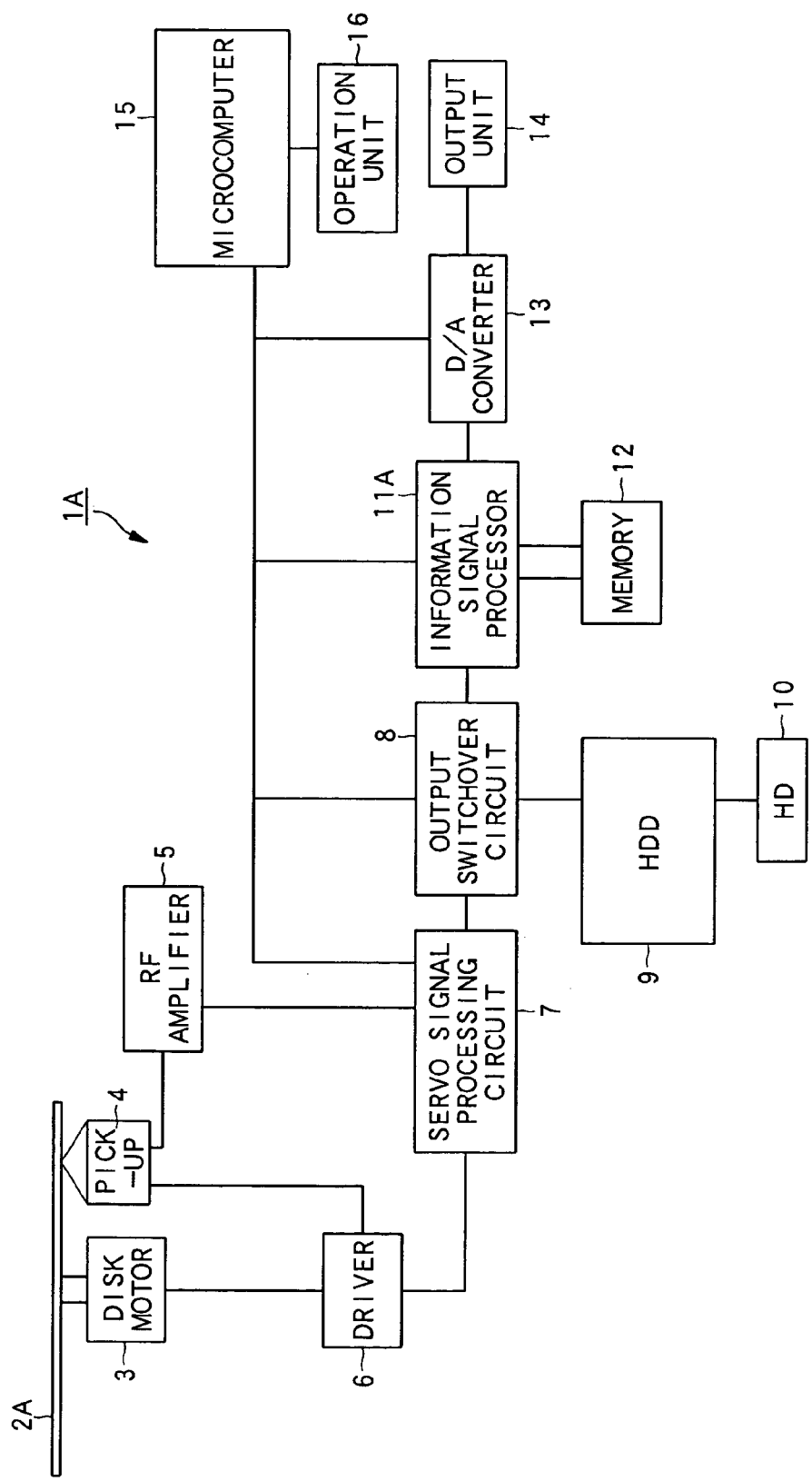
FIG. 5 is a block diagram showing a second embodiment of an information recording reproducing apparatus according to the present invention.

FIG. 5 is a block diagram showing the second embodiment of the information recording reproducing apparatus according to the present invention, in which the essential configurations are identical to those in the first embodiment. Hence only some configurations different from those in the first embodiment will now be described below.

As shown in FIG. 5, an information recording reproducing apparatus 1A according to the embodiment is provided, in which audio data compressed on for example MP3 (MPEG-1 Audio Layer-III) is recorded on a recording medium 2A. The pickup 4 is able to read out the compressed audio data at the normal reading speed (i.e., an unmultiplied reading speed defined for every recording medium). To rotate the disk motor 3 at the unmultiplied speed CLV, the servo signal processing circuit 7 uses a signal read by the pickup 4 to control the disk motor 3 at the normal reading speed. In the second embodiment, an information signal processor 11A expands the compressed audio data read from the memory 12 to supply the expanded audio data to the D/A converter 13.

Because the MP3 compresses audio data at a scale of ½, reading out the compressed audio data at the normal reading speed results in that an amount of audio data ten times larger than that (decompressed audio data) in the first embodiment is accumulated in the memory 12. In other words, this is equivalent to the fact that decompressed audio data is read out at the reading speed ten times as large as the normal speed. The compressed audio data is read out from the memory 12 at the normal reading speed to supply them to the information signal processor 11A, where the audio data is expanded. The expanded audio data is then subjected to D/A conversion at the D/A converter, and then outputted as sound from the output unit 14. When it is assumed that it takes for example 9 seconds to perform one cycle from reading out the compressed audio data from the memory 12 to its output through the output unit 14, the compressed audio data can be read out from the memory 12 at intervals of 9 seconds.

The $\frac{1}{10}$-compressed audio data stored in the memory 12 is subjected to 10-time expansion at the information signal processor 11A, so that the audio data can be outputted as normal decompressed audio data from the output unit 14 at the normal speed.

Figure 6:
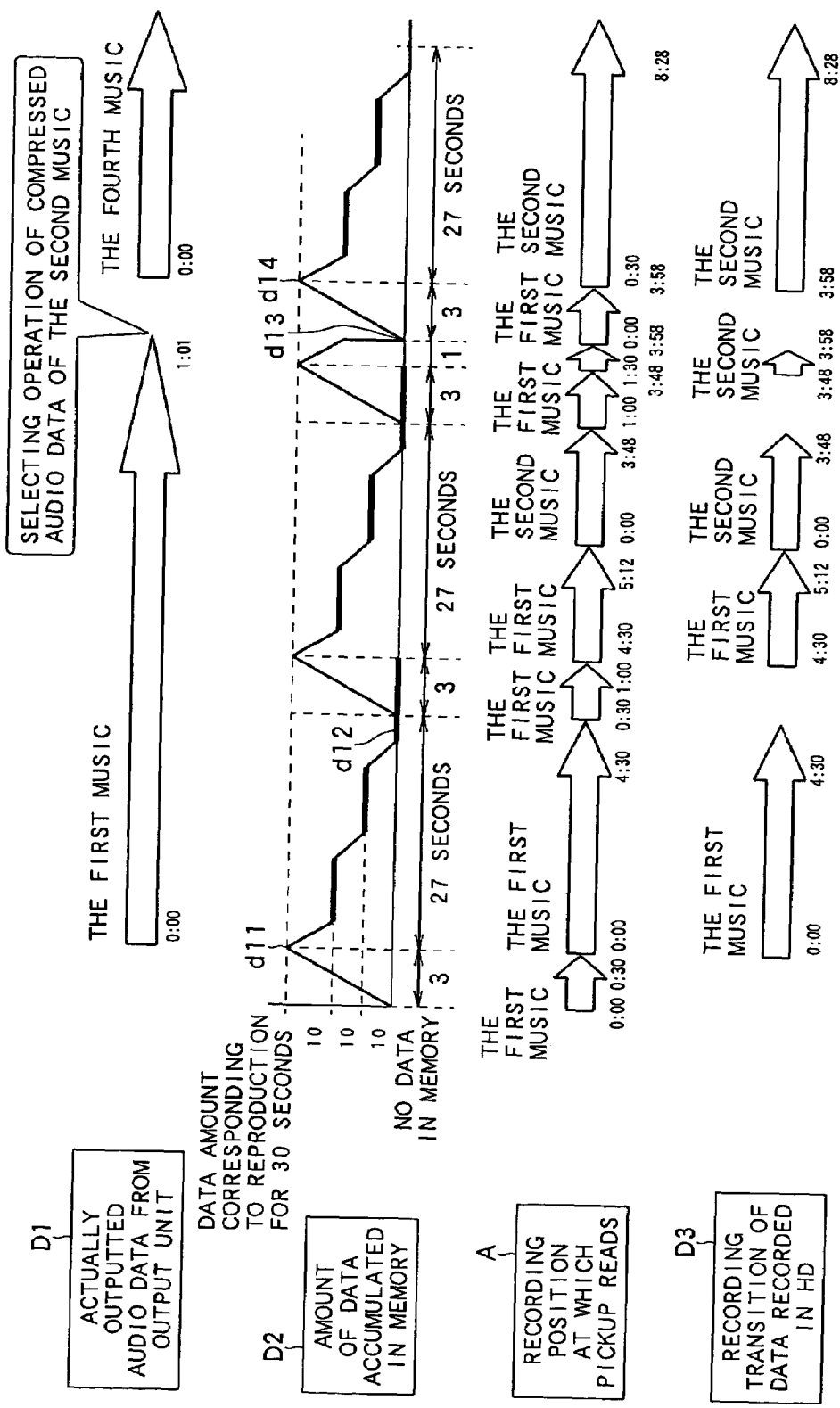
FIG. 6 is an illustration showing reading and recording operations carried out by the apparatus according to the second embodiment.
Figure 7:
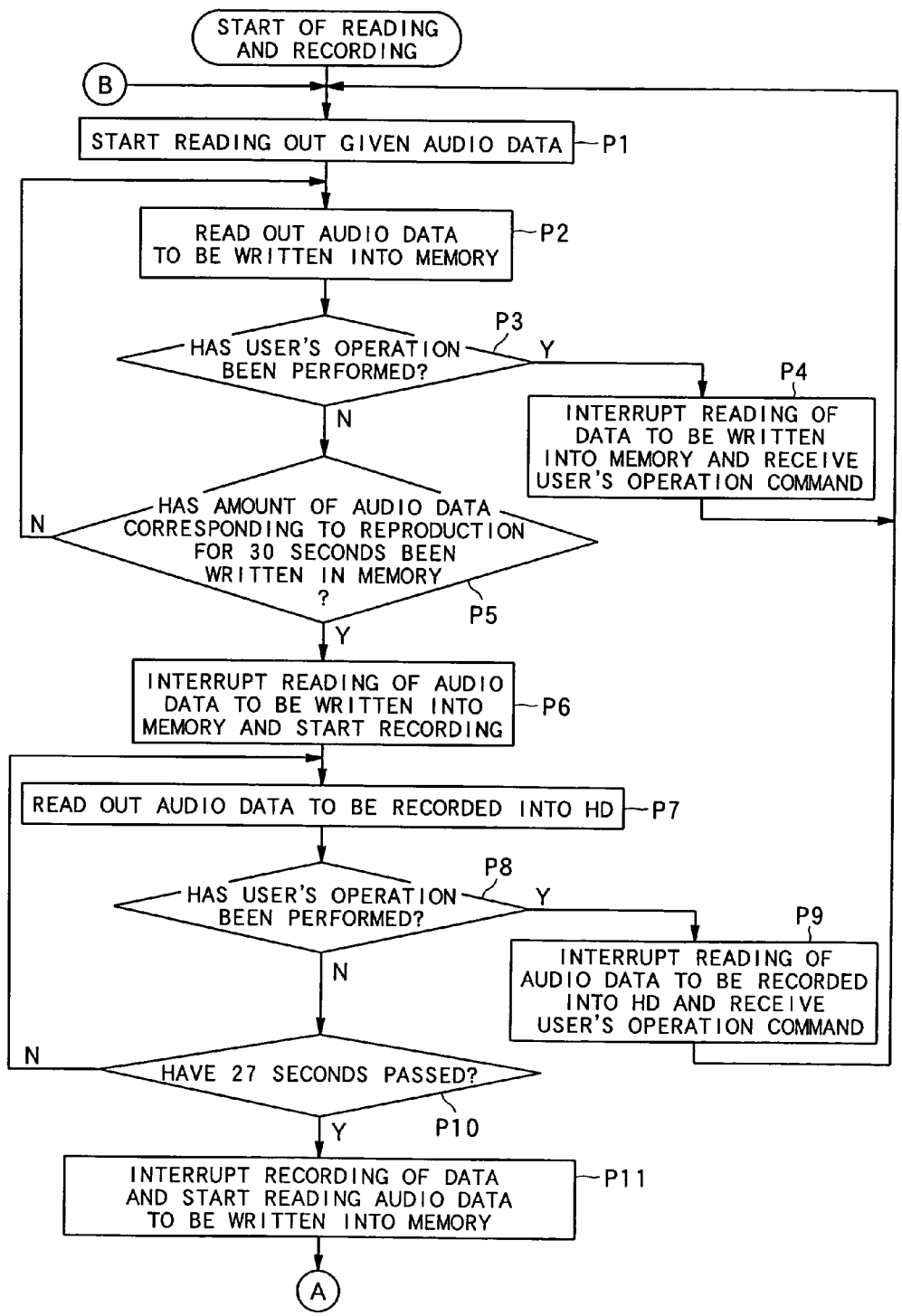
FIG. 7 is a flowchart showing the reading and recording operations in the second embodiment.

Referring to FIGS. 6 to 8, the operations in the second embodiment will now be described. FIG. 6 explains the reading and recording operations in this embodiment.

In the information recording reproducing apparatus 1A according to the second embodiment, as stated above, audio data recorded on the recording medium 2A is composed of audio data compressed at the $\frac{1}{10}$ scale. The pickup 4 reads the compressed audio data from the recording medium 2A at the normal reading speed. And the information signal processor 11A, D/A converter 13, and output unit 14 are in charge of outputting the compressed audio data from the memory 12 at the normal speed.

The memory 12 has the capacity of memorizing an amount of decompressed audio data that corresponds to acquisition carried out for 3 seconds (i.e., for $\frac{1}{10}$-compressed audio data, 3 seconds). While the information signal processor 11A is under expansion of the $\frac{1}{10}$-comprssed audio data, reading out audio data from the memory 12 is stopped, and the audio data is read out from the memory 12 after the expansion (de-compression).

Moreover, as shown in FIG. 6, after the memory 12 is loaded with compressed audio data of which amount corresponds to acquisition of decompressed audio data for 30 seconds, the compressed audio data is read out by the information signal processor 11A. That is, in the second embodiment, there is no action that compressed audio data is written into the memory 12, while the written compressed audio data is read out.

FIG. 6 is depicted in the similar manner to FIG. 2, where there are shown expanded (de-compressed) audio data D1 actually outputted as sound from the output unit 14, an amount D2 of compressed audio data accumulated in the memory 12, reading transitions and recording positions A of compressed audio data on the recording medium 2A through the pickup 4, and recording transitions of compressed audio data D3 to be recorded on the HD 10.

As pictorially shown in FIG. 6, the expanded audio data D1 actually outputted by the output unit 14 is provided at the normal speed (i.e., the unmultiplied speed). The directions of arrows in FIG. 6 show the elapse of time.

Concerning the accumulated amount D2 of compressed audio data on the memory 12, the lateral axis shows an elapse time including a reading elapse time for writing compressed audio data into the memory 12 and an output elapse time for outputting expanded audio data from the memory 12, while the longitudinal axis shows an accumulated amount D2 of compressed audio data written on the memory 12 (in FIG. 6, however, the accumulated amount D2 is depicted on condition that the audio data is expanded). This accumulated amount D2 varies depending on the elapse time.

The reading positions A shown in FIG. 6 include recording positions A of compressed audio data on the recording medium 2A, which are read out by the pickup 4 to write the audio data into the memory 12, and recording positions A of compressed audio data on the recording medium 2A, which are read out by the pickup 4 to record the audio data on the HD 10. The arrows pictorially show the transitions of the reading positions A as the time goes by.

The recording transitions of compressed audio data D3 to be recorded on the HD 10 corresponds to the reading positions A of compressed audio data on the recording medium 2A, which are read out by the pickup 4. In other words, the recording transitions of compressed audio data D3 show which compressed audio data read out from the recording medium 2A by the pickup 4 is recorded on the HD 10.

For the sake of an easier understanding, time information about the recording positions A on the recording medium 2A is denoted on the assumption that compressed audio data is converted to expanded audio data.

The relationships among the various amounts illustrations in FIG. 6 will now be detailed together with the block diagram shown in FIG. 5.

At first, the microcomputer 15 controls the servo signal processing circuit 7 to allow the driver 6 to move the pickup 4 at the leading position of compressed audio data of the first piece of music on the recording medium 2A. The compressed audio data of the first music is then read out at the normal reading speed. That is, the pickup 4 starts reading out compressed audio data from a recording position A of "0:00" of the first music.

After this start, compressed audio data on the recording medium 2A is read out, for instance, for a period of 3 seconds such that an amount of the read-out compressed audio data corresponding to acquisition of expanded audio data for a period of 30 seconds ranging from a recording position A of "0:00" to another recording position A of "0:30" is obtained. In this case, the microcomputer 15 controls the output switchover circuit 8 so that its internal path is switched to the information signal processor 11A, thus compressed audio data being not recorded on the HD 10, but being written on the memory 12. Further, the time for reading out compressed audio data from the recording medium 2A can be measured by a timer incorporated in the microcomputer 15.

Since the audio data on the recording medium 2A is $^{1}\!/_{10}$-compressed audio data, an amount of compressed audio data which is read out for the period of 3 seconds is equal to an amount of expanded audio data to be read out for 30 seconds. Accordingly, as shown in FIG. 6, an accumulated amount D2 of compressed audio data on the memory 12 can reach an amount d11 corresponding to the acquisition of compressed audio data for 30 seconds.

When an amount D2 of compressed audio data accumulated on the memory 12 reaches the above amount d1, the microcomputer 15 issues a command that reading out the compressed audio data be interrupted temporarily. Then the internal path of the output switchover circuit 8 is switched to the HD 10, and concurrently with this, information showing the recording position A of "0:30" of the compressed audio data of the first music on the recording medium 2A, which has been read out so far, is recorded into an internal memory of the microcomputer 15.

Then, the operation is shifted to recording the compressed audio data into the HD 10. At first, the pickup 4 located at the recording position A "0:30" of the compressed audio data of the first music on the recording medium 2A is returned to the recording position A "0:00" showing the leading position of the compressed audio data of the first music. Then, from the recording position A "0:00," the compressed audio data is read out at the normal speed.

That is, though reading the compressed audio data with the use of the pickup 4 has advanced to the recording position "0:30" of the first music, the compressed audio data that was read out so far has not already been present on the HD 10. By using the information indicating the recording position "0:00" memorized in the internal memory thereof, the microcomputer 15 conducts control such that the pickup 4 is returned to the recording position "0:00" of the first music for reading compressed audio data. The read-out compressed audio data will not be written on the memory 12, but recorded into the HD 10. During this recording operation, the compressed audio data stored on the memory 12 is expanded (de-compressed) by the information signal processor 11A, and then outputted as sound from the output unit 14 at the normal speed.

When the recording operation toward the HD 10 is started, the compressed audio data of the first music on the recording medium 2A, an amount of which corresponds to the acquisition of expanded audio data for 30 seconds from the recording positions A "0:00" to "0:30," is accumulated on the memory 12 (refer to the accumulated amount d11 in FIG. 62).

From this state, the compressed audio data is intermittently read out by the information signal processor 11A for 27 seconds until an amount of compressed audio data accumulated in the memory 12 reduces down to zero (for this period of 27 seconds, expanded audio data D1 is outputted as sound), during which time the compressed audio data is recorded into the HD 10. The audio data recorded on the recording medium 2A is compressed as a scale of $^{1}\!/_{10}$, an amount of compressed audio data, which corresponds to acquisition of expanded audio data for 270 seconds (4 minutes and 30 seconds), can be recorded into the HD 10 for the period of 27 seconds.

This period of 27 seconds allowing the accumulated data amount in the memory 12 to be reduced down to zero is measured by the timer of the microcomputer 15. In addition, this period of 27 seconds is set to an amount longer than a period of time during which the compressed audio data accumulated in the memory 12 is outputted as sound by the information signal processor 11A, D/A converter 13 and output unit 14. The output of compressed audio data of this time from the memory 12 can thus overlap on compressed audio data to be written next time into the memory 12, so that the output of audio data from the memory 12 can be continuous, though the accumulated data amount D2 in the memory 12 becomes zero temporarily.

When the accumulated data amount D2 in the memory 12 is lowered to zero as shown by d12 in FIG. 6, the recording operation toward the HD 10 is interrupted. The internal path in the output switchover circuit 8, which has been directed to the HD 10, is switched back to the information signal processor 11A. Also information indicative of a recording position A of "4:30" of the audio data of the first music on the recording medium 2A, which has been read out so far, is memorized into the internal memory. Based on the information showing the recording position "0:30" of the compressed audio data of the first music, the microcomputer 15 performs control such that the pickup 4 is moved back to the recording position "0:30" and re-start the operation for reading out the compressed audio data to be written into the memory 12. Like the foregoing, compressed audio data, which corresponds to the acquisition of expanded audio data for 30 seconds, is written into the memory 12 for 3 seconds. Concurrently with this writing, expanded audio data is outputted as sound through the output unit 14 for 30 seconds.

When the amount D2 of compressed audio data accumulated on the memory 12 reaches the amount d11 (that is, when 3 seconds have passed since starting writing data into the memory 12), the microcomputer 15 issues an command that reading out the compressed audio data through the pick up 14 be interrupted temporarily. Then the internal path of the output switchover circuit 8 is switched to the HD 10, and information showing the recording position A "1:00" of the compressed audio data of the first music on the recording medium 2A, which has been read out so far, is recorded into the internal memory of the microcomputer 15.

Instead, based on the information showing the recording position A "4:30" memorized in the internal memory, the pickup 4 is moved to the recording position to re-start reading compressed audio data to be written on the HD 10. The read-out compressed audio data is recorded into the HD 10, while the compressed audio data accumulated in the memory 12 is read out in an intermittent manner.

Like the above, for 27 seconds, the compressed audio data is read out from the memory 12 so that corresponding expanded audio data is outputted as sound, during which time the compressed audio data is recorded into the HD 10. An amount of compressed audio data corresponding to acquisition of expanded audio data for 270 seconds is thus added to the data in the HD 10. Hence after completing recording the compressed audio data of the first music toward the HD, and compressed audio data of the second piece of music, of which final recording position A is 3:48, is recorded in succession.

Like the first embodiment, in the internal memory of the microcomputer 15, a piece of information indicating the current final recording position A of the compressed audio data written on the memory 12 and another piece of information indicating the current final recording position A of the compressed audio data recorded on the HD 10 are stored in mutually different manners.

When the accumulated data amount D2 in the memory 12 is lowered to zero in FIG. 6, the recording operation toward the HD 10 is interrupted to again prepare for the operation for reading compressed audio data to be written into the memory 12. Concretely, the internal path in the output switchover circuit 8, which has been directed to the HD 10, is switched back to the information signal processor 11A. Also information indicative of the recording position A "3:48" of the compressed audio data of the second music on the recording medium 2A, which has been read out so far, is memorized into the internal memory. Based on the information showing the recording position A "1:00" of the compressed audio data of the first music, the microcomputer 15 performs control such that the pickup 4 is moved back to the recording position "1:00" and re-start the operation for reading out the compressed audio data to be written into the memory 12. Like the foregoing, compressed audio data, which corresponds to the acquisition of expanded audio data for 30 seconds, is written into the memory 12 for 3 seconds.

When the amount D2 of compressed audio data accumulated on the memory 12 reaches the amount d11 (that is, when 3 seconds have passed since starting writing data into the memory 12), the microcomputer 15 issues an command that reading out the compressed audio data through the pick up 14 be interrupted temporarily. Then the internal path of the output switchover circuit 8 is switched from the information signal processor 11 to the HD 10, and information showing the recording position A "1:30" of the compressed audio data of the first music, which has been read out so far, is recorded into the internal memory.

Instead, based on the information showing the recording position A "3:48" memorized in the internal memory, the pickup 4 is moved to the recording position to re-start reading compressed audio data to be written on the HD 10. The read-out compressed audio data is recorded into the HD 10, while the compressed audio data accumulated in the memory 12 is read out in an intermittent manner.

In cases where there is an issuance of a user's operation command via the operation unit 16 during the recording operation toward the HD 10, the recording positions are shifted as follows. Assume that such an issuance is received at the time when recording compressed audio data into the HD 10 has carried out for 1 second and the operation command is selection of the fourth piece of music. In this case, the recording operation toward the HD 10 is interrupted.

To be specific, the microcomputer 15 controls the servo signal processing unit 7 so that the driver 6 is driven to move the pickup 4 from the recording position A "3:58" of the second music to a recording position A "0:00" indicating the leading position of compressed audio data of the fourth music. Thus, the compressed audio data of the fourth music is read out from its leading position on the recording medium 2A.

In this case, the compressed audio data of the first music stored in the memory 12 is discarded, as shown by a reference d13 in FIG. 6, and instead, the compressed audio data of the fourth music is read out via the pickup 4 to be written into the memory 12. To do this, the internal path in the output switchover circuit 8 is switched from the HD 10 to the information signal processor 11A. Also, information about the recording position A of "3:58" of the second music which has been subjected to the reading is memorized into the internal memory. In this situation, the expanded audio data of the first music, of which length extends to 1 minute and 1 second, is actually subjected to a sound output from the output device 14.

The compressed audio data of the fourth music is read out by the pickup 4 between the recording positions A of "0:00" and "0:30" on the recording medium 2A, and the read-out data is written into the memory 12.

As shown by a reference d14 in FIG. 6, because the compressed audio data of which amount corresponds to the acquisition of expanded audio data for 30 seconds, the reading operation with the compressed audio data with the use of the pickup 4 is interrupted, and the recording operation toward the HD 10 is performed instead. That is, the internal path in the output switchover circuit 8 is switched from the information signal processor 11A to the HD 10. Memorized into the internal memory is information showing the recording position A "0:30" of the compressed audio data subjected to the reading operation so far. Then, based on a recording position A "3:38" of the second music, the pickup 4 is moved to this recording position to re-start the operation for reading out compressed audio data to be recorded into the HD 10. Thus, the compressed audio data that has been read out is recorded into the HD 10, while the compressed audio data stored in the memory 12 is intermittently read out by the information signal processor 11A.

Repeating operations in the same way as the above makes it possible that a user selects freely a desired piece of music (that is, compressed audio data) recorded on the recording medium 2A and the compressed audio data selected by the user is outputted as sound, without being forced to end the recording operation toward the HD 10.

Referring to FIGS. 7 and 8, the reading and recording operations in the first embodiment will now be described.

As shown in FIG. 7, first, reading out specified audio data from a recording medium 2A is started to write the read-out compressed audio data into the memory 12 (step P1). For example, responsively to a user's operation to load the information recording reproducing apparatus 1A with the recording medium 2A, reading out audio data of the first piece of music is activated. That is, from the leading address of the first music on the recording medium 2A, compressed audio data is read out for 3 seconds (step P2).

Because the audio data on the recording medium 2A is 1/10-compressed audio data, the compressed audio data to be read out for 3 seconds mounts to a volume corresponding to acquisition of expanded audio data for 30 seconds. Thus, audio data corresponding to the acquisition for remaining 30 seconds (in the case of expanded audio data) is accumulated in the memory 12. Steps P2 to P5 will be repeated until an amount of compressed audio data is accumulated in the memory 12.

Until such an accumulation of audio data is realized in the memory 12, the microcomputer 15 monitors a user's operation by determining whether or not a user has operated the operation unit 16 to issue a selection of another piece of music, san production operation, random reproduction operation, or others (step P3). If it is determined that the user has conducted any operation, such as the above (YES at step P3), the microcomputer 15 performs control in such a manner that the reading operation with the compressed audio data to be written into the memory 12 is interrupted and accepts an operation command originated from the user (step P4). The processing is then returned to step P1.

As a result, the reading operation with compressed audio data directed to writing into the memory 12, which has been conducted so far, is interrupted and the compressed audio data which has been stored in the memory 12 is discarded. In cases where, for example, the user's operation is selection of a piece of music, the pickup 4 is moved to the leading address of compressed audio data of the selected music on the recording medium 2A. To again write compressed audio data into the memory 12, the compressed audio data of the selected music is subjected to reading from its leading address.

In contrast, at step P3, if it is determined that any user's operation has not been issued (NO at step P3), the processing is made to proceed to step P5.

At step P5, the microcomputer 15 determines if or not compressed audio data corresponding to acquisition of expanded audio data for 30 seconds has been written into the memory 12 (that is, the timer has counted up 3 seconds). If this determination shows that such data writing is completed (YES at step P5), the reading operation with the compressed audio data through the pickup 4, which has been conducted to write the compressed audio data into the memory 12, is temporality interrupted. At the time when an accumulated amount in the memory 12 becomes equal to an amount corresponding to the acquisition for 30 seconds (for expanded audio data), a final address at which compressed audio data is finally read out is memorized, and then recording processing toward the HD 10 is started (step P6).

In the recording processing, the processing for reading compressed audio data to be recorded into the HD 10 is carried out (step P7). For reading out audio data in step P7, control is made such that the output switchover circuit 8 switches its internal path to the HD 10 and the pickup 4 moves to the leading address of the compressed audio data of the first music on the recording medium 2A. Then reading out the compressed audio data is started from its leading address. The resultant read-out compressed audio data is recorded, in turn, from the first music, into the HD 10 via the HDD 9, not outputted through the output unit 14. During this recording operation toward the HD 10, the compressed audio data accumulated in the memory 12 is expanded by the information signal processor 11A and outputted as sound via the output unit 14.

In contrast, if the accumulated audio data corresponding to the acquisition for 30 seconds (for expanded audio data) has yet to be accumulated in the memory 12 (NO at step P5), the processing is returned to step P2. Thus, until such an accumulation is realized, the reading processing with compressed audio data is executed to write the compressed audio data into the memory 12.

At the time when the recording processing with the accumulated audio data toward the HD 10 is started, the memory 12 has memorized an amount of compressed audio data corresponding to the acquisition for 30 seconds (for expanded audio data). During the recording operation, the compressed audio data in the memory 12 is expanded and outputted as sound in sequence at the normal speed through the output unit 14. The accumulated amount of the compressed audio data in the memory 12 thus decreases step by step. When the accumulated amount is reduced down to zero, the duration of the recording processing is measured as being 27 seconds. In consequence, owing to the fact that the audio data on the recording medium 2A is compressed at a scale of 1/10, an amount of compressed audio data that equals the acquisition of expanded audio data for 270 seconds (4 minutes and 30 seconds) can be recorded into the HD 10 for a period of 27 seconds.

During the reading-out operation of the compressed audio data executed at step P7 in order to record compressed audio data into the HD 10, the microcomputer 15 monitors a user's operation by determining whether or not a user has operated the operation unit 16 to issue a selection of another piece of music, san production operation, random reproduction operation, or others (step P8). If it is determined that the user has conducted any operation, such as the above (YES at step P8), the microcomputer 15 performs control in such a manner that the recording operation toward the HD 10 is interrupted and accepts an operation command originated from the user (step P9). The processing is then returned to step P1.

Through the processing at step P9, the compressed audio data that remains in the memory 12 at the time when the recording processing is ordered to interrupt is discarded and the internal path in the output switchover circuit 8 is switched to the information signal processor 11A. Moreover, information showing a final address of the audio data in the HD 10, which is determined at the time the recording processing is interrupted, is memorized.

As stated above, the processing is returned to step P1. Thus, in the case that the operation command receiving at step P1 from the operation unit 16 is selection of a piece of music, the pickup 4 is moved to the leading address of the compressed audio data of the selected music in order to start, from the leading address, the reading processing with compressed audio data to be written into the memory 12. This reading processing is followed by the processing at step P2 and subsequent steps. In this following proceeding, at step P7, the reading processing to record audio data into the HD 10 is re-started from the final address of the compressed audio data determined at the time when the recording processing was interrupted in response to the user's operation.

In contrast, at step P8, if it is determined that any user's operation has not been issued (NO at step P8), the processing is made to proceed to step P10.

At step P10, the microcomputer 15 determines whether or not a period of 27 seconds serving as a time for recording processing has passed with the use of the internal timer. If such a time elapse has passed (YES at step P10), the recording processing toward the HD 10 is interrupted, while the internal path in the output switchover circuit 8 is switched to the information signal processor 11A to re-start reading compressed audio data via the pickup 4, so that the read-out compressed audio data is written into the memory 12 (step P11).

To be specific, a final address of compressed audio data in the HD 10, which is determined at the time when the recording processing is interrupted, is memorized, whilst the pickup 4 is moved back to a recording position specified by the final address of compressed audio data in the memory 12, the final address being memorized by the processing at step P6. Reading out compressed audio data is thus re-started at the moved-back recording position to write the read-out compressed audio data into the memory 12.

In contrast, at step P10, if it is determined that the time for recording processing (27 seconds) has not passed yet (NO at step P10), the processing is returned to step P7 to continue the recording processing toward the HD 10.

At the time when the reading processing is re-started at step P11, there is no accumulation of data in the memory 12. Hence, until the accumulated amount of compressed audio data rises up from this amount to an amount corresponding to the acquisition for 30 seconds (for expanded audio data), the processing for reading compressed audio data via the pickup 4 is performed (step P12 in FIG. 8).

Then, it is again determined whether or not the user has performed such an operation as selection of a piece of music (step P13). When it is determined that the user has performed such an operation (YES at step P13), the reading operation with the compressed audio data to be written into the memory 12 is interrupted and an operation command originated from the user is received (step P14). The processing is then returned to step P1.

At step P14, the compressed audio data stored in the memory 12 at the time when the recording processing is interrupted is discarded and the internal path in the output switchover circuit 8 is switched to the information signal processor 11A. In cases where, for example, the user's operation is selection of a piece of music, the pickup 4 is moved to a recording position specified by the leading address of compressed audio data of the selected music on the recording medium 2A. To write compressed audio data into the memory 12, the compressed audio data of the selected music is subjected to reading from its leading address.

In contrast, at step P13, if it is determined that any user's operation has not been issued (NO at step P13), the processing is made to proceed to step P15.

At step P15, it is determined whether or not an amount of compressed audio data that corresponds to the acquisition for 30 seconds (for expanded audio data) has been written in the memory 12. If such an amount of audio data has been written in the memory 12 (YES at step P15), the reading processing with compressed audio data to be written into the memory 12 is interrupted to move to recording processing toward the HD 10 (step P16).

The pickup 4 is first moved to a recording position specified by the final address of compressed audio data in the HD 10, the final address being memorized at step P11. The internal path in the output switchover circuit 8 is switched to the HD 10 in order that the processing for reading compressed audio data subjected to the recording processing is re-started at the recording position pointed by the final address. Then compressed audio data is read out from the final address, while the read-out compressed audio data is subjected to be recorded into the HD 10 by means of the HDD 9 (step P17).

During the reading-out operation with the compressed audio data executed at step P17 in order to record compressed audio data into the HD 10, the microcomputer 15 monitors a user's operation by again determining whether or not a user has operated the operation unit 16 to issue a selection of another piece of music, scan reproduction operation, random reproduction operation, or others (step P18). If it is determined that the user has conducted any operation, such as the above (YES at step P18), the microcomputer 15 performs control in such a manner that the recording operation toward the HD 10 is interrupted and accepts an operation command originated from the user (step P19). The processing is then returned to step P1.

Through the processing at step P19, the compressed audio data that remains in the memory 12 at the time when the recording processing is ordered to interrupt is discarded and the internal path in the output switchover circuit 8 is switched to the information signal processor 11A. Moreover, information showing a final address of the compressed audio data in the HD 10 is memorized.

As stated above, the processing is returned to step P1. Thus, in the case that the operation command receiving at step P1 from the operation unit 16 is selection of a piece of music, the pickup 4 is moved to the leading address of the compressed audio data of the selected music in order to start, from the leading address, the reading processing with audio data to be written into the memory 12. This reading processing is followed by the processing at step P2 and subsequent steps. In this following proceeding, at step P7, the reading processing to record compressed audio data into the HD 10 is re-started from the final address of the compressed audio data determined at the time when the recording processing was interrupted in response to the user's operation.

In contrast, at step P18, if it is determined that any user's operation has not been issued (NO at step P18), the processing is made to proceed to step P20.

Then, at step P20, it is determined by the microcomputer 15 whether or not the reading and recording operations should be ended or not, based on, for example, the same way as that described in the first embodiment. When it is determined that the termination of the reading and recording operations has been commanded (YES at step P20), such operations are ended. When it is however determined the operations should be continued (NO at step P20), the processing goes to step P21.

At step P21, the microcomputer 15 monitors a count of the timer to determine whether or not the time for recording processing, which is determined to be 27 seconds, has passed. If such a time elapse has been detected (YES at step P21), the recording processing toward the HD 10 is interrupted, while the internal path in the output switchover circuit 8 is switched to the audio signal processor 11 to re-start reading compressed audio data via the pickup 4, so that the read-out compressed audio data is written into the memory 12 (step P22).

To be specific, a final address of compressed audio data in the HD 10, which is determined at the time when the recording processing is interrupted, is memorized, whilst the pickup 4 is moved back to a recording position specified by the final address of compressed audio data in the memory 12, the final address being memorized by the processing at step P16. Reading compressed audio data is thus re-started at the moved-back recording position to write the read-out compressed audio data into the memory 12.

In contrast, at step P21, if it is determined that the above time elapse (27 seconds) has yet to be detected (NO at step P21), the processing is returned to step P17 to continue the recording processing toward the HD 10.

After the processing at step P22, the processing is made to return to step P12 so as to repeat the processing at step P12 and subsequent steps.

As stated above, in the information recording reproducing apparatus 1A according to the second embodiment, the audio data on the recording medium 2A is compressed at a predetermined sale, the pickup 4 can read the compressed audio data from the recording medium at the normal speed, and the output unit 16 can receive audio data expanded from the compressed audio data detected from the recording medium 2A and to output the expanded audio data at the normal speed. This configuration allows the disk motor 3 to rotate at the normal rotation speed given by the specification thereof, whereby it is easier for the microcomputer 15 to control the rotation speed of the disk motor 3. The other configurations and operations are identical or similar to those in the first embodiment.

The foregoing configurations according to the second embodiment can also be modified in many ways. In the second embodiment, audio data is compressed at a scale of 1/10 and read out at the normal speed, but this configuration is not a decisive list. For example, 1/10-comprssed audio data can be read out at a speed, such as 0.5-multipleid speed, slower than the normal reading speed. In such an example, audio data can still be written into the memory 12 at a speed that is five times faster than the normal speed. Accordingly, the information signal processor 11A is able to have an appropriately set time for the expansion in obtaining expanded audio data corresponding to acquisition for 30 seconds. In reading audio data via the pickup 4 at the 0.5-multipleid speed, the output shaft of the disk motor 3 is rotated at the 0.5-multiplzied speed CLV.

Moreover, the foregoing first and second embodiments are not limited to the configuration where, as stated, audio data on the recording medium is recorded into the HD 10. This recording technique can be applied to a configuration where video data on a recording medium (e.g., DVD) is recorded into the HD 10. In addition, the recording technique according to the present invention can also be applied to recording means other than the HD. It may also be possible to compose the information to be recorded on the recording medium by adopting both of audio and video data, thus enhancing versatility of the information recording reproducing apparatus.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2002-365114 filed on Dec. 17, 2002 including the specification, claims, drawings and summary is incorporated herein by reference in its entirety.

What is claimed is:

1. An apparatus for recording and reproducing information, comprising:
   a reading device configured to read out information recorded on a recording medium;
   a first recording device in which the information read out by the reading device is written;
   an output device configured to output the information written in the first recording device;
   a second recording device in which the information read out by the reading device is recorded;
   an operation device configured to be used to issue operation commands including a selection command newly selecting information among all the information recorded on the recording medium, the newly selected information being different from information currently outputted from the output device; and
   a controller configured to, in cases where the output device is in operation for outputting the information and the second recording device is in operation for recording the information therein, respond to the selection command by controlling
   (i) the reading device so as to read from the recording medium the information consisting of the newly selected information and halfway recorded information subjected to recording in the second recording device at a time when the selection command is issued,
   (ii) the newly selected information read by the reading device such that the newly selected information is written into the first recording device,
   (iii) the newly selected information written in the first recording device such that the newly selected information is read out and outputted via the output device, and
   (iv) the halfway recorded information read by the reading device such that the halfway recorded information is recorded into the second recording device so as to keep recording positions of the halfway recorded information in the second recording device continuous before and after the issuance of the selection command.

2. The apparatus according to claim 1, wherein the reading device is configured to read out, from the recording medium, the information to be outputted via the output device at a speed faster than an output speed at which the output device outputs the information written in the first recording device.

3. The apparatus according to claim 1, wherein the information recorded on the recording medium is composed of compressed data and the reading device is configured to read out the compressed data recorded on the recording medium at a speed equal to or slower than a speed at which the output device outputs the compressed data written in the first recording device.

4. An apparatus for recording and reproducing information, comprising:
   a reading configured device to read out information recorded on a recording medium;
   a first recording device in which the information read out by the reading device is written;
   an output device configured to output the information written in the first recording device;
   a second recording device in which the information read out by the reading device is recorded;
   an operation device configured to be used to issue operation commands including a selection command newly selecting information among all the information recorded on the recording medium, the newly selected information being different from information currently outputted from the output device; and
   a controller configured to
   start recording the information into the second recording device at a time when an amount of the information accumulated in the first recording device reaches a given amount; and
   respond to, in cases where the output device is in operation for outputting the information and the second recording device is in operation for recording the information therein, the selection command by controlling
(i) the reading device so as to read from the recording medium the information consisting of the newly selected information and halfway-recorded information subjected to recording in the second recording device at a time when the selection command is issued,
(ii) the newly selected information read by the reading device such that the newly selected information is written into the first recording device,
(iii) the newly selected information written in the first recording device such that the newly selected information is read out and outputted via the output device, and
(iv) the halfway recorded information read by the reading device such that the halfway recorded information is recorded into the second recording device so as to keep recording positions of the halfway recorded information in the second recording device continuous before and after the issuance of the selection command.

5. The apparatus according to claim 4, wherein the reading device is configured to read out, from the recording medium, the information to be outputted via the output device at a speed faster than an output speed at which the output device outputs the information written in the first recording device.

6. The apparatus according to claim 4, wherein the information recorded on the recording medium is composed of compressed data and the reading device is configured to read out the compressed data recorded on the recording medium at a speed equal to or slower than a speed at which the output device outputs the compressed data written in the first recording device.

7. A method of recording and reproducing information recorded on a recording medium, comprising steps of:
reading out the information recorded on the recording medium;
writing the read-out information into a first recording device;
outputting the information written in the first recording device via an output device;
recording the read-out information from the recording medium into a second recording device;
receiving operation commands including a selection command for newly selecting information among all the information recorded on the recording medium, the newly selected information being different from information currently outputted from the output device; and
responding to, in cases where the output device is in operation for outputting the information and the second recording device is in operation for recording the information therein, the selection command by
(i) reading from the recording medium the information consisting of the newly selected information and halfway-recorded information subjected to recording in the second recording device at a time when the selection command is issued,
(ii) writing the newly selected information into the first recording device,
(iii) reading out and outputting, via the output device, the newly selected information written in the first recording device, and
(iv) recording the halfway recorded information into the second recording device so as to keep recording positions of the halfway recorded information in the second recording device continuous before and after the issuance of the selection command.

8. A program recorded in a memory and readable by a computer for recording and reproducing information recorded on a recording medium, the program read from the memory and installed in the computer allowing the computer to perform the steps:
receiving operation commands including a selection command for newly selecting information among all the information recorded on the recording medium, the newly selected information being different from information currently outputted from the output device; and
responding to, in cases where the output device is in operation for outputting the information and the second recording device is in operation for recording the information therein, the selection command by
(i) reading from the recording medium the information consisting of the newly selected information and halfway-recorded information subjected to recording in the second recording device at a time when the selection command is issued,
(ii) writing the newly selected information into a first recording device,
(iii) reading out and outputting, via the output device, the newly selected information written in the first recording device, and
(iv) recording the halfway recorded information into the second recording device so as to keep recording positions of the halfway recorded information in a second recording device continuous before and after the issuance of the selection command.

9. An information recording medium in which a computer-readable program is stored, the program being for recording and reproducing information recorded on a recording medium, the program read from the information recording medium and installed in the computer allowing the computer to perform the steps:
receiving operation commands including a selection command for newly selecting information among all the information recorded on the recording medium, the newly selected information being different from information currently outputted from the output device; and
responding to, in cases where the output device is in operation for outputting the information and the second recording device is in operation for recording the information therein, the selection command by
(i) reading from the recording medium the information consisting of the newly selected information and halfway-recorded information subjected to recording in the second recording device at a time when the selection command is issued,
(ii) writing the newly selected information into a first recording device,
(iii) reading out and outputting, via the output device, the newly selected information written in the first recording device, and
(iv) recording the halfway recorded information into the second recording device so as to keep recording positions of the halfway recorded information in a second recording device continuous before and after the issuance of the selection command.

10. The apparatus according to claim 1, wherein the controller comprises:
means for accepting the selection command when the output device is in operation for outputting the information and the second recording device is in operation for recording therein the information;
means for allowing the reading device to read from the recording medium the information consisting of the newly selected information and the halfway recorded information sequentially by turns every predetermined amount assigned to each of the newly selected information and the halfway recorded information;

means for writing the newly selected information into the first recording device, the newly selected information being read by the reading device;

means for reading and outputting, via the output device, the newly selected information written in the first recording device; and means for recording the halfway recorded information read by the reading device into the second recording device such that recording positions of the halfway recorded information in the second recording device is kept continuous before and after the issuance of the selection command.

11. The apparatus according to claim 10, wherein the reading devices is configured to read out, from the recording medium, the information to be outputted via the output device at a speed faster than an output speed at which the output device outputs the information written in the first recording device.

12. The apparatus according to claim 10, wherein the information recorded on the recording medium is composed of compressed data and the reading device is configured to read out the compressed data recorded on the recording medium at a speed equal to or slower than a speed at which the output device outputs the compressed data written in the first recording device.

* * * * *